US011232708B1

(12) United States Patent
Fields et al.

(10) Patent No.: US 11,232,708 B1
(45) Date of Patent: *Jan. 25, 2022

(54) TECHNOLOGY FOR REAL-TIME DETECTION AND MITIGATION OF REMOTE VEHICLE ANOMALOUS BEHAVIOR

(71) Applicant: STATE FARM MUTUAL AUTOMOBILE INSURANCE COMPANY, Bloomington, IL (US)

(72) Inventors: Brian Mark Fields, Phoenix, AZ (US); John A. Nepomuceno, Bloomington, IL (US); Scott Thomas Christensen, Salem, OR (US); Duane Christiansen, Normal, IL (US); Steven C. Cielocha, Bloomington, IL (US); Kristopher Keith Gaudin, Bloomington, IL (US); Michael Bernico, Bloomington, IL (US); Nathan L. Tofte, Downs, IL (US); Steve Roberson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,032

(22) Filed: Jun. 26, 2020

Related U.S. Application Data

(63) Continuation of application No. 16/707,912, filed on Dec. 9, 2019, now Pat. No. 10,733,886, which is a (Continued)

(51) Int. Cl.
*G08G 1/0967* (2006.01)
*G08G 1/01* (2006.01)
(Continued)

(52) U.S. Cl.
CPC ....... *G08G 1/096708* (2013.01); *B60W 40/09* (2013.01); *B60W 50/08* (2013.01);
(Continued)

(58) Field of Classification Search
CPC ....... G08G 1/096708; G08G 1/096741; G08G 1/0112; B60W 40/09; B60W 50/08;
(Continued)

(56) References Cited

U.S. PATENT DOCUMENTS 9,147,353 B1    9/2015  Slusar
9,365,218 B2    6/2016  Pallett et al.
(Continued)

*Primary Examiner* — Ryan W Sherwin
(74) *Attorney, Agent, or Firm* — Marshall, Gerstein & Borun LLP

(57) ABSTRACT

Systems and methods for real-time detection and mitigation anomalous behavior of a remote vehicle are provided, e.g., vehicle behavior that is consistent with distracted or unexpectedly disabled driving. On-board and off-board sensors associated with a subject vehicle may monitor the subject vehicle's environment, and behavior characteristics of a remote vehicle operating within the subject vehicle's environment may be determined based upon collected sensor data. The remote vehicle's behavior characteristics may be utilized to detect or determine the presence of anomalous behavior, which may be anomalous for the current contextual conditions of the vehicles' environment. Mitigating actions for detected remote vehicle anomalous behaviors may be suggested and/or automatically implemented at the subject vehicle and/or at proximate vehicles to avoid or reduce the risk of accidents, injury, or death resulting from the anomalous behavior. In some situations, authorities may be notified.

20 Claims, 9 Drawing Sheets

Related U.S. Application Data continuation of application No. 15/794,252, filed on Oct. 26, 2017, now Pat. No. 10,540,892.

(51) Int. Cl.
    *G01C 21/34* (2006.01)
    *B60W 40/09* (2012.01)
    *G07C 5/00* (2006.01)
    *B60W 50/08* (2020.01)

(52) U.S. Cl.
    CPC ......... *G01C 21/3415* (2013.01); *G07C 5/008* (2013.01); *G08G 1/0112* (2013.01); *G08G 1/096741* (2013.01); *B60W 2540/30* (2013.01); *B60W 2556/50* (2020.02)

(58) Field of Classification Search
    CPC ......... B60W 2556/50; B60W 2540/30; B60W 30/08; G01C 21/3415; G07C 5/008
    See application file for complete search history.

(56) References Cited

U.S. PATENT DOCUMENTS

| | | |
|---|---|---|
| 9,672,734 B1 | 6/2017 | Ratnasingam |
| 10,540,892 B1 * | 1/2020 | Fields .................. G08G 1/0112 |
| 10,733,886 B1 * | 8/2020 | Fields ................ G01C 21/3415 |
| 2008/0167821 A1 | 7/2008 | Breed |
| 2013/0187792 A1 | 7/2013 | Egly |
| 2016/0284212 A1 | 9/2016 | Tatourian et al. |
| 2018/0107942 A1 | 4/2018 | Jiang et al. |
| 2018/0126985 A1 | 5/2018 | Lee et al. |

* cited by examiner

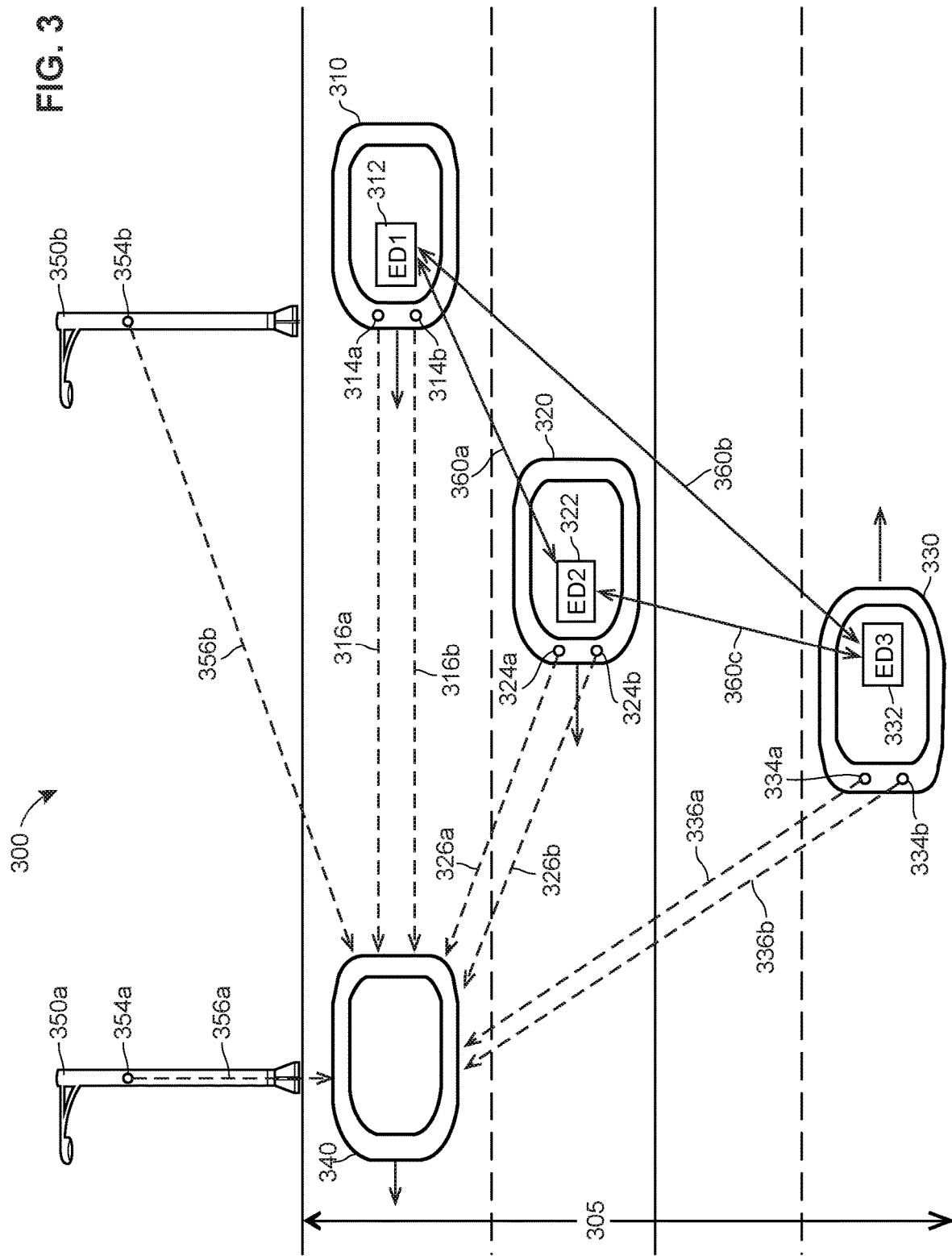

TECHNOLOGY FOR REAL-TIME DETECTION AND MITIGATION OF REMOTE VEHICLE ANOMALOUS BEHAVIOR

CROSS-REFERENCE TO RELATED APPLICATIONS

The present application is a continuation of U.S. patent application Ser. No. 16/707,912, filed Dec. 9, 2019, entitled "TECHNOLOGY FOR REAL-TIME DETECTION AND MITIGATION OF REMOTE VEHICLE ANOMALOUS BEHAVIOR," which is a continuation of U.S. patent application Ser. No. 15/794,252, filed Oct. 26, 2017, entitled "TECHNOLOGY FOR REAL-TIME DETECTION AND MITIGATION OF REMOTE VEHICLE ANOMALOUS BEHAVIOR," the disclosures of each of which are herein incorporated by reference in its entirety.

FIELD OF DISCLOSURE

The present disclosure is directed to the real-time detection and mitigation of anomalous behavior of a remote vehicle. More particularly, the present disclosure is directed to systems, methods, and techniques for detecting or determining that a remote vehicle is behaving anomalously based upon sensed data and, in some embodiments, determining a mitigating course of action for other vehicles in the vicinity of the remote vehicle to decrease the risk of accident, injury, or death due to the remote vehicle's anomalous behavior.

BACKGROUND

Generally, vehicle operators may drive erratically at times. For example, some vehicle operators may get distracted (e.g., texting on a mobile phone, retrieving a dropped object, etc.), be impaired (e.g., falling asleep at the wheel, intoxicated, under the influence of prescription medications, etc.), or in some extreme cases be disabled by a medical emergency (e.g., a heart attack or stroke) while driving. In another example, anomalous behavior of a vehicle may be caused by its driver responding to an unexpected event (e.g., a deer crossing the road, road kill, a group of bicyclers and/or pedestrians, an icy patch, potholes, etc.), which drivers of other vehicles may not be able to see yet. Operating a vehicle while distracted, while unexpectedly disabled, and/or while responding to an unexpected event may lead to erratic, anomalous behavior of the vehicle, which may put the vehicle operator, additional vehicle occupants, and the occupants of other vehicles in close proximity at risk of an accident, injury, or death. Generally speaking, "anomalous" behavior of a vehicle generally refers to vehicle behavior that deviates from or is inconsistent with common or expected vehicle behavior (for example, incongruous, inconsistent, abnormal, unusual, erratic, and/or unsafe behavior), and anomalous vehicle behavior may include vehicle behaviors that increase the risk of accident, injury, or death to proximate vehicles and pedestrians.

SUMMARY

The present disclosure generally relates to systems, methods, and techniques for the detection and mitigation of anomalous behavior of a remote vehicle, e.g., in real-time. Embodiments of example systems and methods are summarized below. The methods and systems summarized below may include additional, less, or alternate actions, including those discussed elsewhere herein.

In an embodiment, a method may include monitoring an environment in which the first vehicle is operating, e.g., a vehicle environment. The monitoring of the vehicle environment may use data collected by set of sensors associated with the first vehicle. The method may also include determining, using one or more processors associated with the first vehicle and based upon a set of sensor data, a set of characteristics that is indicative of one or more behaviors of a remote vehicle operating within the vehicle environment, and accessing, using the one or more processors, a set of anomalous vehicle behavior characteristics determined based upon a set of historical vehicle behavior data, where the set of historical vehicle behavior data is based upon data obtained by a plurality of sensors while a plurality of drivers operated a plurality of vehicles. The method additionally includes comparing, using the one or more processors, the set of characteristics indicative of the one or more behaviors of the remote vehicle with the set of anomalous vehicle behavior characteristics; determining, using the one or more processors and based upon the comparing, that the remote vehicle is exhibiting an anomalous behavior; and mitigating an effect of the anomalous behavior of the remote vehicle, including providing an indication of the detected, anomalous behavior of the remote vehicle to the first vehicle, a second vehicle operating in the vehicle environment, and/or a public safety authority.

In an embodiment, a system for the detection and mitigation of anomalous behavior of a vehicle is provided. The system may include one or more communication interfaces; one or more processors associated with a first vehicle and communicatively connected to a set of sensors associated with the first vehicle via the one or more communication interfaces; one or more tangible, non-transitory, computer-readable media coupled to the one or more processors; and computer-executable instructions stored on the one or more computer-readable media thereby particularly configuring the one or more computer-readable media. The one or more processors may be configured to execute computer-executable instructions to cause the system to monitor, via the set of sensors, an environment in which the first vehicle is operating, the environment in which the first vehicle is operating being a vehicle environment; determine, based upon a set of sensor data generated by the set of sensors, a set of characteristics indicative of one or more behaviors of a remote vehicle operating within the vehicle environment; and access a set of anomalous vehicle behavior characteristics, where the set of anomalous vehicle behavior characteristics is generated from a set of historical vehicle behavior data, and the set of historical vehicle behavior data corresponds to data obtained by a plurality of sensors while a plurality of drivers operated a plurality of vehicles. The computer-executable instructions, when executed, may further cause the system to compare the set of characteristics indicative of the one or more behaviors of the remote vehicle with the set of anomalous vehicle behavior characteristics; determine, based upon the comparison of the one or more behaviors of the remote vehicle and the set of anomalous vehicle behavior characteristics, an anomalous behavior exhibited by the vehicle; and mitigate an effect of the anomalous behavior of the remote vehicle, which may include providing, via the one or more communication interfaces, an indication of the detected, anomalous behavior to the first vehicle, a second vehicle operating in the vehicle environment, and/or a public safety authority.

Systems or computer-readable media storing executable instructions for implementing all or part of the systems and/or methods described herein may also be provided in some embodiments. Systems for implementing such methods may include one or more of the following: a special-purpose computing device, a mobile computing device, a personal electronic device, an on-board computer or electronic device, one or more remote servers or cloud computing system, one or more remote data storage entities, one or more sensors, one or more communication modules configured to communicate wirelessly via radio links, radio frequency links, and/or wireless communication channels, and/or one or more non-transitory, tangible program memories coupled to one or more processors of the special-purpose computing device, mobile computing device, personal electronic device, on-board computer or electronic device, and/or one or more remote servers or cloud computing system. Such program memories may store instructions, which, when executed by the one or more processors, may cause a system described herein to implement part or all of one or more methods described herein. Additional or alternative features described herein below may be included in some embodiments.

BRIEF DESCRIPTION OF THE FIGURES

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 3 depicts an exemplary vehicle environment surrounding a subject vehicle in which real-time detection and mitigation of remote vehicle anomalous behavior may be implemented, in accordance with some embodiments.

DETAILED DESCRIPTION

Figure 1A:
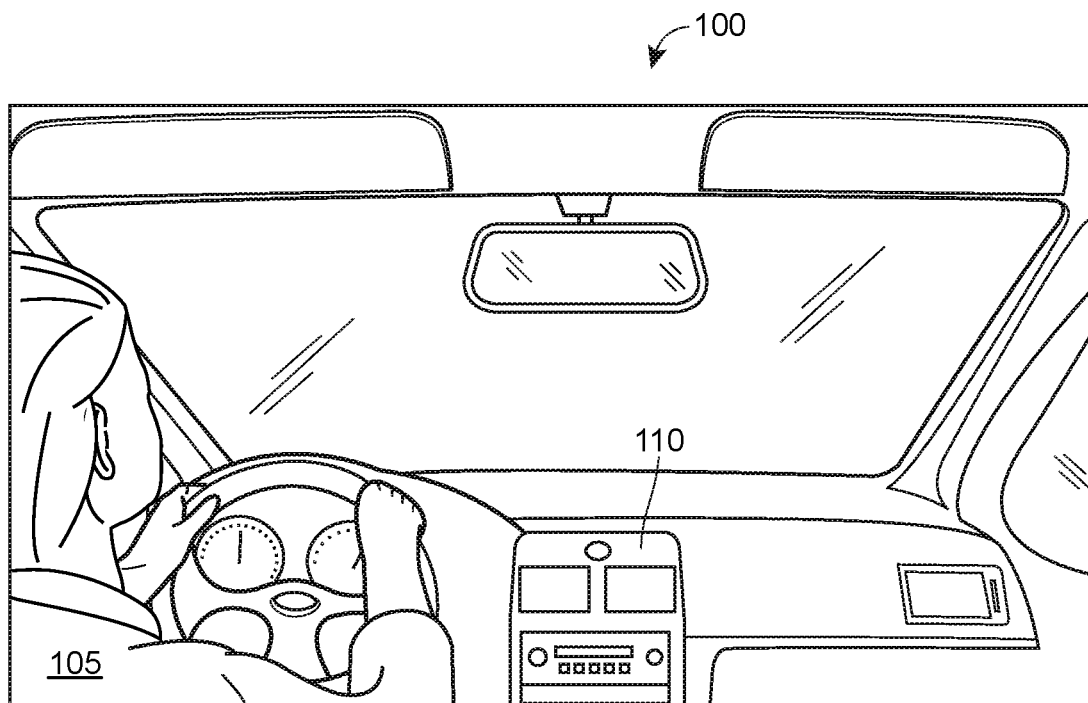
FIGS. 1A and 1B depict exemplary environments within a vehicle that includes various components configured to facilitate various functionalities related to real-time detection and mitigation of remote vehicle anomalous behavior, in accordance with some embodiments.

The present embodiments may relate to, inter alia, novel real-time detection and mitigation of anomalous behavior of a remote vehicle. As generally used herein, the term "remote" vehicle generally refers to another vehicle operating in the environment of a subject vehicle being operated by a driver. That is, the term "remote" is with respect to the subject vehicle. Additionally, as used herein, the terms "vehicle" and "automobile" are used interchangeably, and generally refer to any type of powered transportation device, which includes, and is not limited to, a car, truck, bus, motorcycle, or boat, and may include fully- or partially-automated, self-driving, or autonomous vehicles.

As previously discussed, some vehicle operators may get distracted, become impaired, or unexpectedly disabled while operating a vehicle. Vehicle operators who are distracted, impaired, or unexpectedly disabled may operate the vehicle erratically, and thus the vehicle may exhibit anomalous behavior. For example, when a vehicle operator is sleepy, the vehicle that he or she is operating may swerve erratically. In another example, a vehicle may intermittently speed up and slow down while a vehicle operator is texting. Other examples of anomalous vehicle behaviors are possible. Generally speaking, anomalous vehicle behaviors, as generally referred to herein, refers to operational behaviors of a vehicle that are visibly, or observably out of the ordinary, incongruous, inconsistent, abnormal, unusual, erratic, unsafe, and/or unexpected (e.g., for given contextual or environmental conditions), and which may be indicative of the driver being distracted or suddenly disabled, such as the driver suffering an unexpected medical impairment, being intoxicated or otherwise chemically affected, falling asleep, searching for something under the seat, texting, interacting with his or her smartphone or device, etc.

Conventionally, it falls upon each driver who is operating a vehicle in the vicinity of the anomalously-behaving vehicle to individually notice the anomalous behavior of the remote vehicle and to responsively adjust his or her driving behavior to reduce the risk of accident, injury, and/or death. For example, a driver who notices the anomalous behavior of a remote vehicle may slow down and create more distance between his/her vehicle and the remote vehicle. Alternatively, the noticing driver may speed up and pass (while giving wide berth to) the anomalously-behaving vehicle. However, as each individual operates his or her vehicle independently without knowledge of what other vehicle operators in the vicinity are (or are not) noticing and planning to do, the mitigating actions that each individual driver chooses to take may contradict other drivers' actions. Accordingly, the individual actions of multiple drivers may collectively cause an even more risky driving environment. Further, different individuals may notice and/or interpret anomalous behavior of a remote vehicle differently and at different times (if at all). For example, an individual may only become aware of anomalous behavior of a remote vehicle only when his/her vehicle is very close to the other vehicle. At that point, it may be too late to take a mitigating action such as changing lanes or changing the route of their vehicle, and the individual may face an unavoidable dangerous situation, especially if other vehicles are in close vicinity.

The novel systems, methods, and/or techniques disclosed herein, though, may address these and other dangerous driving situations by automatically detecting, identifying, or determining a remote vehicle's anomalous behavior and, in some embodiments, automatically suggesting or even automatically causing mitigating actions to be performed or implemented by one or more vehicles operating in the vicinity of the remote vehicle, thereby reducing risk of accident, injury, or death, and increasing the safety of the driving environment. For example, the novel systems, methods, and/or techniques disclosed herein may leverage information acquired by various on-board and off-board sensors to automatically detect and/or identify anomalous behavior of a remote vehicle. Additionally, the systems, methods, and/or techniques disclosed herein may alert a vehicle driver or operator of a subject vehicle of the detected or identified anomalous behavior of a remote vehicle, e.g., through the use of an electronic device associated with the subject vehicle. Further, in some embodiments, the systems, methods, and/or techniques disclosed herein may suggest or provide, to one or more drivers of vehicles in the vicinity of or proximate to the anomalously-behaving remote vehicle, respective mitigating actions for one or more drivers to perform in order to create a safer driving environment for the subject vehicle, its operator/driver, and/or proximate vehicles and pedestrians. In some embodiments, the novel systems, methods, and/or techniques disclosed herein may send commands or instructions to one or more surrounding vehicles to automatically or autonomously perform or implement a mitigating action in response to the detected anomalous behavior of the remote vehicle. Further, in some cases, the novel systems, methods, and/or techniques disclosed herein may automatically notify a public authority of the detected, anomalous behavior of the remote vehicle.

The novel systems, methods, and techniques described herein offer numerous benefits. For example, the detection or identification of a remote vehicle exhibiting anomalous behavior may be more quickly and accurately identified or determined as compared to relying on an individual driver to notice and correctly identify the anomalous behavior. Additionally or alternatively, more than one vehicle and/or respective driver in the vicinity of an anomalously-behaving remote vehicle may be notified of the remote vehicle's detected anomalous behavior. As such, collective mitigation actions taken by multiple drivers may be coordinated across multiple vehicles and, in the scenarios in which vehicle behavior is able to be automatically modified, may be performed more quickly, thereby increasing the safety for all vehicles, drivers, and pedestrians in the vicinity of the anomalously-behaving remote vehicle. Still additionally or alternatively, in some scenarios, a public authority may be notified of anomalous behavior of a remote vehicle, and emergency response vehicles may be deployed before the anomalous behavior of the remote vehicle causes an accident, injury, or death. It should be appreciated that other benefits are envisioned.

Additionally, because the novel systems, methods, and techniques disclosed herein employ the automatic detection, collection, compiling, storing, and displaying of data associated with a remote vehicle's anomalous behavior and, in some embodiments, automatically performing or implementing mitigating actions, the novel systems, methods, and techniques are necessarily rooted in computer technology in order to overcome the noted shortcomings that specifically arise in the realm of detection and mitigation of anomalous behavior of a remote vehicle, e.g., accuracy of identification of the anomalous behavior, speed of detection, speed and appropriateness of mitigating actions, coordination of multiple mitigating actions, etc. For example, the collection of data from sensors that are on-board and/or off-board a driver's vehicle may provide various perspectives of a remote vehicle's driving behavior, which allows for the quicker and more accurate detection and identification of anomalous behavior, especially when compared to currently known techniques which rely on the individual ability and judgment of each driver in the vicinity of the remote vehicle.

Similarly, the novel systems, methods, and/or techniques provide improvements in technical fields, namely, sensor data processing and generating mitigation actions for a vehicle. The various systems, methods, and/or techniques described herein employ complex steps that go beyond the mere concept of simply retrieving and combining data using a computer. In particular, the hardware and software components capture sensor data, analyze the sensor data, determine relative location and movement of multiple vehicles, and determine, generate, and communicate mitigation actions so as to increase the safety of the driving environment. This combination of elements further imposes meaningful limits in that the operations are applied to improving sensor data processing and generating mitigation actions to improve traffic safety and lessen the chances of an accident, injury, or death in a meaningful and effective way.

According to implementations, the novel systems, methods, and/or techniques disclosed herein may support dynamic, real-time, or near real-time analysis of any captured, received, and/or detected data. In particular, the systems, methods, and/or techniques disclosed herein may receive, in real-time or near real-time, data indicative of anomalous behavior of a remote vehicle while the driver is operating a subject vehicle, and may generate corresponding mitigation actions in real-time and near-real-time so that the behavior of the subject vehicle (and, in some cases, of proximate vehicles) may be adjusted in response to thereby prevent or reduce the occurrence and/or severity of a collision, create a safer vehicle environment, etc.

FIG. 1A illustrates an example depiction of an interior of a vehicle 100 (e.g., a "subject" vehicle) that may include various components associated with and/or utilized by embodiments of the systems, methods, and techniques disclosed herein for detecting and mitigating, in real-time, the anomalous behavior of remote vehicles that are operating in the environment or vicinity of the subject vehicle 100. In some scenarios, a person or individual 105 may be transported by the vehicle 100. In FIG. 1A, the individual 105 being transported by the vehicle 100 is depicted as a driver sitting in the driver's seat of the vehicle 100 and operating the vehicle 100. However, it should be appreciated that the individual 105 may be a passenger of the vehicle, and may sit in a front passenger seat or any of a set of rear passenger seats. In scenarios in which the individual 105 is a passenger of the vehicle 100, another individual may operate the vehicle 100, and/or the vehicle 100 may operate in a fully- or partially-autonomous manner.

The vehicle 100 may be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system or an aftermarket system. As such, the electronic device 110 is generally referred to herein as a "vehicle" electronic device 110. In some implementations, the vehicle electronic device 110 may be configured to interface with additional components (e.g., vehicle sensors and/or various vehicle behavior and/or operational control systems) of the vehicle 100. In FIG. 1A, only one vehicle electronic device 110 is depicted, although it is understood in other embodiments, multiple vehicle electronic devices 110 may be installed in the vehicle 100 and may be communicatively connected. For ease of reading, though, the vehicle electronic device 110 is referred to herein using the singular tense.

Figure 1B:
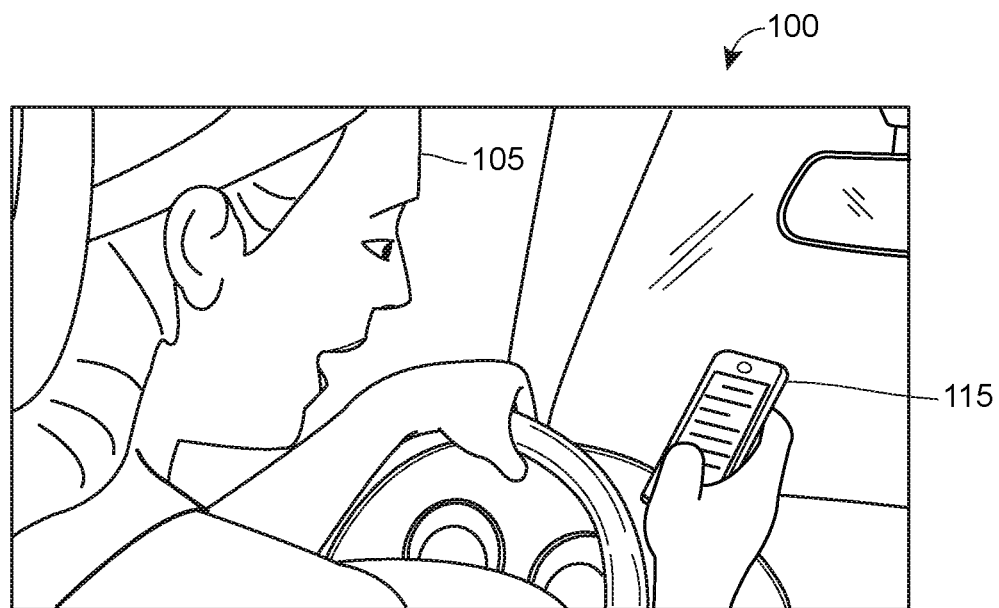

FIG. 1B depicts another configuration of an interior of the vehicle 100 that may include various components associated with the systems and methods associated with and/or utilized by embodiments of the systems, methods, and techniques disclosed herein for real-time detection and mitigation of remote vehicle anomalous behavior. Similar to the depiction of FIG. 1A, the depiction of FIG. 1B illustrates the individual 105 who may be an operator or passenger of the vehicle. The individual 105 may access and interface with an electronic device 115 that may be located within the vehicle 100. Although FIG. 1B depicts the individual 105 holding the electronic device 115, it should be appreciated that the electronic device 115 may be located within the vehicle 100 without the individual 105 physically contacting the electronic device 115. For example, the electronic device 115 may be secured within a mount.

According to embodiments, the electronic device 115 may be any type of electronic device such as a mobile device (e.g., a smartphone), which may be releasably and fixedly secured to the vehicle 100. It should be appreciated that other types of portable electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. Accordingly, the electronic device 115 is generally referred to herein as a "portable" electronic device 115. In some implementations, the portable electronic device 115 may be configured to interface with additional components (e.g., in a wired and/or wireless manner) of the vehicle 100, such as vehicle sensors and/or the vehicle electronic device 110.

It is noted that, in various embodiments, a vehicle 100 may include the vehicle electronic device 110 and not the portable electronic device 115, a vehicle 100 may include the portable electronic device 115 and not the vehicle electronic device 110, or a vehicle 100 may include both the vehicle electronic device 110 and the portable electronic device 115. In some embodiments, the vehicle electronic device 100 and the portable electronic device 115 may be communicatively connected, e.g., via a wired or wireless link.

Figure 2A:
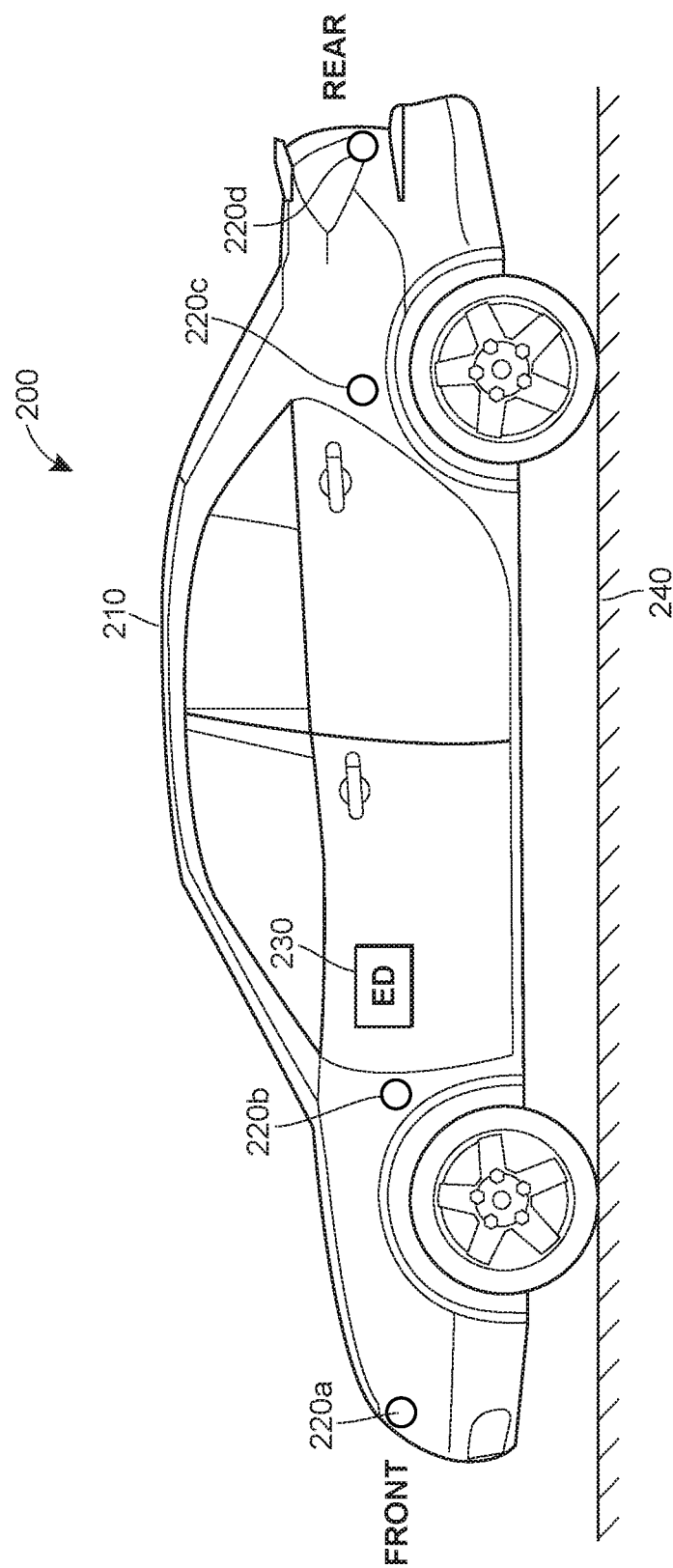
FIG. 2A depicts an exemplary side view of the vehicle of FIGS. 1A and 1B, in accordance with some embodiments.

FIG. 2A illustrates an exemplary depiction 200 of a side view of a vehicle 210 positioned on a roadway 240 with an exemplary view of the locations of example components of a system for real-time detection and mitigation of anomalous behavior of other vehicles that are remote with respect to the vehicle 210. In an embodiment, the vehicle 210 may be an implementation of the vehicle 100 of FIG. 1A and/or FIG. 1B. In the implementation illustrated in FIG. 2A, an electronic device 230 is depicted as being located in the vicinity of the center console of the vehicle 210. In other implementations, the electronic device 230 may be located in other parts of the vehicle 210. The electronic device 230 may comprise, for example, the vehicle electronic device 110 of FIG. 1A and/or the portable electronic device 115 of FIG. 1B.

Additionally, in FIG. 2A, a set of sensors 220a-220d (collectively referred to as sensors 220) are disposed at different locations on or at the vehicle 210. Generally speaking, the sensors 220a-220d may sense conditions of and/or detect objects disposed in the environment (and any movement or behavior thereof) in which the vehicle 210 is operating, and may collect data that is indicative and/or descriptive of the sensed conditions and/or objects. In some configurations, the sensors 220a-220d may be disposed on or near the exterior of the vehicle 210, however, in some configurations, one or more of the sensors 220a-220d may be disposed on or in the interior of the vehicle 210 and facing the exterior environment in which the vehicle 210 is disposed (e.g., outwardly facing). In some configurations, at least one of the sensors 220a-220d may be included on or integral to the electronic device 230. For example, at least one of the sensors 220a-220d may be included on or integral to a portable electronic device 115 being transported by the vehicle 210. Whether disposed at or on the vehicle 210 or disposed at or on a portable device 115 being transported by the vehicle 210, though, the sensors 220a-220d are generally referred to herein as "on-board sensors 220," as the sensors 220 are being transported by the vehicle 210. In various implementations, more or fewer numbers of on-board sensors 220 may be disposed at the vehicle 210, and/or the on-board sensors 220 may be disposed at locations at the vehicle 210 different than those which are depicted in FIG. 2A.

The sensors 220a-220d may comprise sensors that utilize any suitable detection or sensing technology, such as radar sensors, LIDAR sensors, ultrasonic sensors, infrared sensors, sensors that utilize some other type of electromagnetic energy, location tracking sensors, proximity sensors, and the like. The sensors 220a-220d may include sensors of multiple different sensing/detection technologies, in some embodiments. Generally speaking, the on-board sensors 220a-220d may actively or passively scan the environment external to the vehicle 210 for objects (e.g., other vehicles, buildings, pedestrians, trees, gates, barriers, animals, etc.) and their movement, weather conditions (e.g., precipitation, wind, visibility, or temperature), roadway topographies, road conditions (e.g., lane markings, potholes, road material, traction, or slope), traffic conditions (e.g., traffic density, traffic congestion, etc.), signs or signals (e.g., traffic signals, speed limits, other jurisdictional signage, construction signs, building signs or numbers, or control gates), infrastructure components (e.g., bridges, tunnels, construction barriers, street lights, etc.), and/or other information that is indicative and/or descriptive of the environment in which the vehicle 210 is operating. Information or data that is generated or received by the on-board sensors 220a-220d may be communicated to the electronic device 230, for example.

Figure 2B:
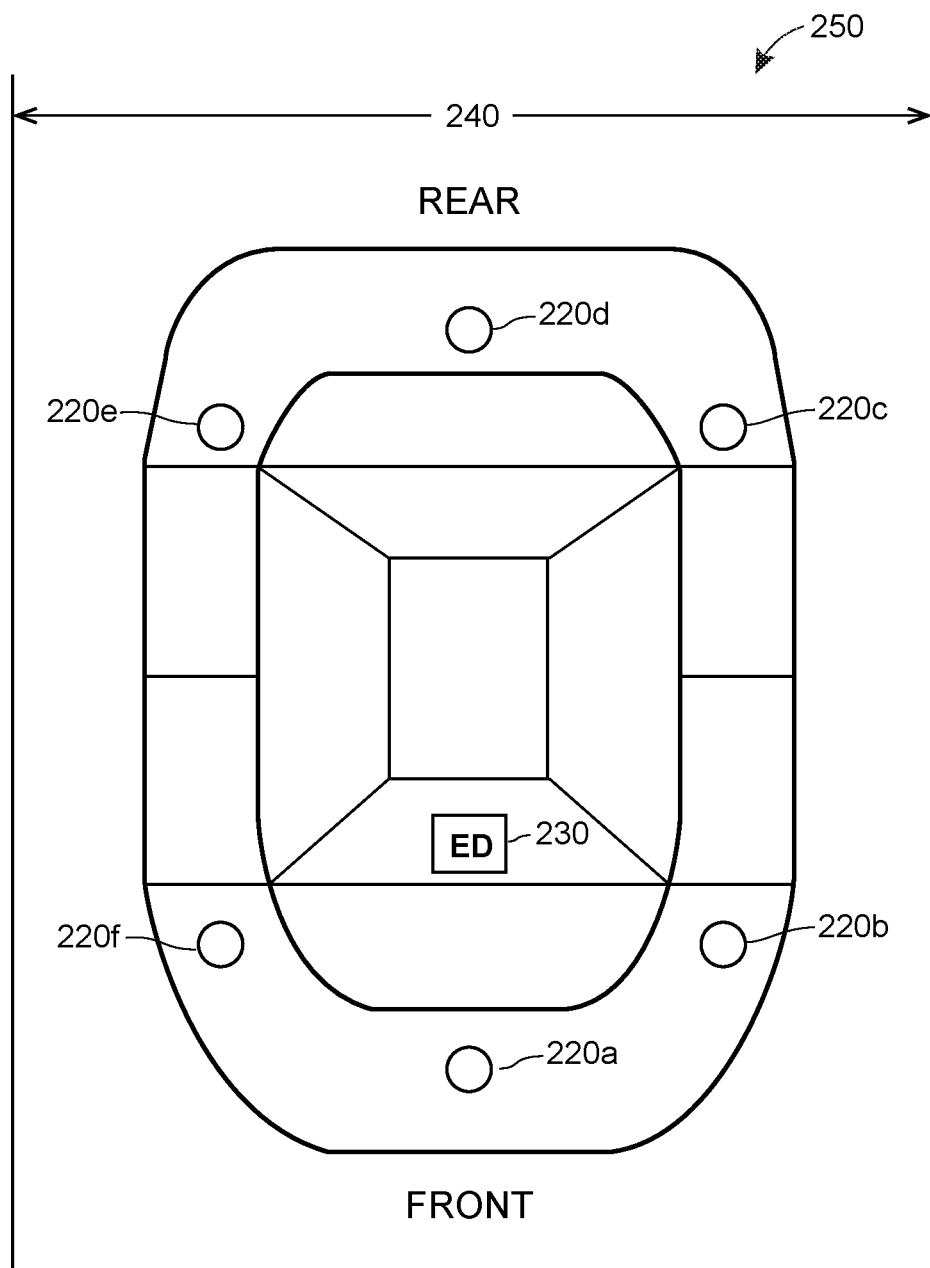
FIG. 2B depicts an exemplary top view of the vehicle of FIGS. 1A and 1B, in accordance with some embodiments.

FIG. 2B illustrates an exemplary depiction 250 of a top view of the vehicle 210 of FIG. 2A positioned on a roadway 240 with an exemplary view of the locations of example components of the system for real-time detection and mitigation of anomalous behavior of remote vehicles with respect to the vehicle 210. FIG. 2B depicts the electronic device 230 and sensors 220a-220d of FIG. 2A, and depicts additional on-board sensors 220e-220f. Similar to the on-board sensors 220a-220d, on-board sensors 220e-220f may be any type or types of sensing and/or detecting sensors, and are illustrated as being disposed at different locations on the exterior of the vehicle 210. In other implementations, there may be more or fewer on-board sensors 220a-220f and the sensors 220a-220f may be disposed at different locations (e.g., at different exterior and/or interior locations that position respective sensors to be outwardly facing) at the vehicle 210 than that which is depicted in FIG. 2B. In some embodiments, at least one of the sensors 220a-220f may be included on or integral to the electronic device 230. For example, at least one of the sensors 220a-220f may be included on or integral to a portable electronic device 115. At any rate, information or data that is generated or received by the on-board sensors 220a-220f may be communicated to the electronic device 230, for example.

FIG. 3 illustrates an exemplary vehicle environment 300 depicting a set of vehicles in operation on a roadway 305. In particular, the environment 300 may include a first vehicle 310 including a respective electronic device (ED1) 312 and one or more on-board sensors 314a-314b (collectively referred to as the on-board sensors 314) disposed at the first vehicle 310. The environment 300 may also include a second vehicle 320 including a respective electronic device (ED2) 322 and one or more on-board sensors 324a-324b (collectively referred to as on-board sensors 324) disposed at the second vehicle 320, and a third vehicle 330 including a respective electronic device (ED3) 332 and one or more on-board sensors 334a-334b (collectively referred to as on-board sensors 334) disposed at the third vehicle 330. In an embodiment, the electronic devices (ED1, ED2, and ED3) 310, 320, and 330 may be respective instances of the vehicle electronic device 110 and/or the portable electronic device 115, or the electronic device 230 of FIGS. 2A and 2B, and the on-board sensors 314, 324, and 334 may be respective instances of the on-board sensors 220 of FIGS. 2A and 2B. It is understood, however, that more or fewer on-board sensors 314, 324, and 334 may be respectively disposed at the vehicles 310, 320, 330, and said on-board sensors 314, 324, and 334 may be located at different locations at or on their respective vehicles than what is depicted in FIG. 3.

As also illustrated in FIG. 3, the environment 300 includes a remote vehicle 340 operating on the roadway 305 in the vicinity of the first, second, and third vehicles 310, 320, and 330. FIG. 3 illustrates the remote vehicle 340, the first vehicle 310, and the second vehicle 320 as traveling in the same direction on the roadway 305, while the third vehicle 330 is traveling in the opposite direction as the vehicles 310, 320, 340. FIG. 3 further depicts one or more street lights 350a-350b (collectively referred to as street lights 350) disposed along the roadway 305. Each of the street lights 350 may include at least one respective sensor 354a and 354b (collectively referred to as sensors 354) disposed thereon. It is understood that, in some embodiments, at least one of the each street lights 350 may respectively include more than one sensor 354, and/or the sensor or sensors 354 may be located at different locations on their respective street light 354 than what is depicted in FIG. 3. Further, while FIG. 3 illustrates the sensors 354 being disposed on street lights 350, in some scenarios, one or more of the sensors 354 may be additionally or alternatively disposed on other components or fixtures that are disposed or located within the environment 300 in which the vehicles 310, 320, 330, and 340 are operating (not shown).

For example, one or more sensors 354 may be disposed on infrastructure components such as roadways, bridges, traffic signals, gates, switches, crossings, overhead passes, tunnels, parking lots or garages, toll booths, docks, hangars, or other similar physical portions of a transportation system's infrastructure. Additionally or alternatively, one or more sensors 354 may be disposed on fixtures such as traffic street signs, railings, posts, guardrails, billboards, portable emergency signage, etc. In some implementations, at least some of the sensors 354 may be included in a sensor network, such as an Internet-of-Things (IoT) sensor network deployed in a city or by some other jurisdiction, a sensor network that supports autonomous vehicles, and/or some other type of sensor network. For ease of discussion, the sensors 354 are generally referred to herein as "off-board" sensors 354, as the sensors 354 are disposed off-board (e.g., separately from or external to, or not transported by) the vehicles 310, 320, 330. It is noted, though, that off-board sensors may not necessarily be limited to sensors that are disposed on fixtures or infrastructure components. In some environments, off-board sensors may be disposed in other vehicles. For example, with respect to the vehicle 310, sensors 324 disposed at vehicle 320 and sensors 334 disposed at vehicle 330 are considered "off-board" the vehicle 310, as the sensors 324, 334 are disposed separately from and external to the vehicle 310 and as the sensors 324, 334 are not being transported by the vehicle 310. Generally speaking, off-board sensors 354 (whether disposed on fixtures, on infrastructure components, or at other vehicles) may sense conditions of and/or objects disposed in the environment in which a subject vehicle is operating, and may collect data indicative and/or descriptive of the sensed conditions and/or objects.

In the environment 300, the on-board sensors 314 associated with the first vehicle 310 may detect 316a-316b (collectively referred to as 316) the movement and behavior of the remote vehicle 340. The electronic device (ED1) 312 associated with the first vehicle 310 may receive corresponding sensor data from its respective on-board sensors 314 and may analyze the sensor data and determine that the remote vehicle 340 may be exhibiting anomalous behavior. The on-board sensors 324 and 334 associated with the second vehicle 320 and third vehicle 330 may also respectively detect 326a-326b (collectively referred to as 326) and 336a-336b (collectively referred to as 336) the movement and behavior of the remote vehicle 340, and may provide respective sensor data to their respective electronic devices ED2 and ED3. In some implementations, the electronic device (ED1) 312 may communicate 360a and 360b with electronic device (ED2) 322 and/or electronic device (ED3) 332 to obtain sensor data generated by the on-board sensors 324 and 334 respectively associated with the second vehicle 320 and the third vehicle 330. For example, the electronic device ED1 312 may initiate requests, for respective sensor data, to electronic devices (ED2 and ED3) 322 and 332, and may receive corresponding responses including the requested sensor data (e.g., references 360a and 360b). In some examples, detected sensor data may be automatically transmitted or broadcast by an electronic device (e.g., the electronic device ED2 322) to the other electronic devices in the vicinity of or proximate to ED2 322 (e.g., to ED1 312 and ED3 332) without first receiving a request for the data, e.g., when other electronic devices being transported by other vehicles are communicatively connected, such as in a network of connected vehicles (not shown). It should be appreciated that electronic device (ED2) 322 and electronic device (ED3) 332 may also communicate 360c with each other.

Additionally, in the environment 300, the off-board sensors 354 may detect 356a-356b the movement and behavior of the remote vehicle 340, and the sensor data generated by the off-board sensors 354 may be obtained by at least some of the electronic devices (ED1, ED2, ED3) 312, 322,332. For example, the off-board sensors 354 may be communicatively connected, via one or more communication interfaces, to a remote server or another computing device (not shown in FIG. 3), and the electronic device (ED1) 312 may access the sensor data from the off-board sensors 354 from the remote server or the another computing device via a network connection. In an additional or alternative example, at least some of the sensor data generated by the off-board sensors 354 may be obtained by the electronic device (ED2) 322 via a wireless connection (which may be a direct wireless connection) without the use of any intervening remote server or computing device. Still additionally or alternatively, at least some of the sensor data generated by the off-board sensors 354 may be automatically broadcast and/or transmitted to vehicle electronic devices (e.g., ED1 312, ED2 322, ED3 332) that are in the vicinity of the sensors 354 (e.g., without having to be first requested), such as when the off-board sensors 354 are included in a sensor network that is communicatively connected to vehicle electronic devices (e.g., ED1 312, ED2 322, ED3 332). For instance, the off-board sensors 354 may be included in a sensor network that supports autonomous vehicle operation on the roadway 350. In some embodiments, the electronic devices (ED1, ED2, and ED3) 312, 322, 332 may also transmit sensor data to the remote server via a network connection, e.g., for historization or long term storage.

Figure 4:
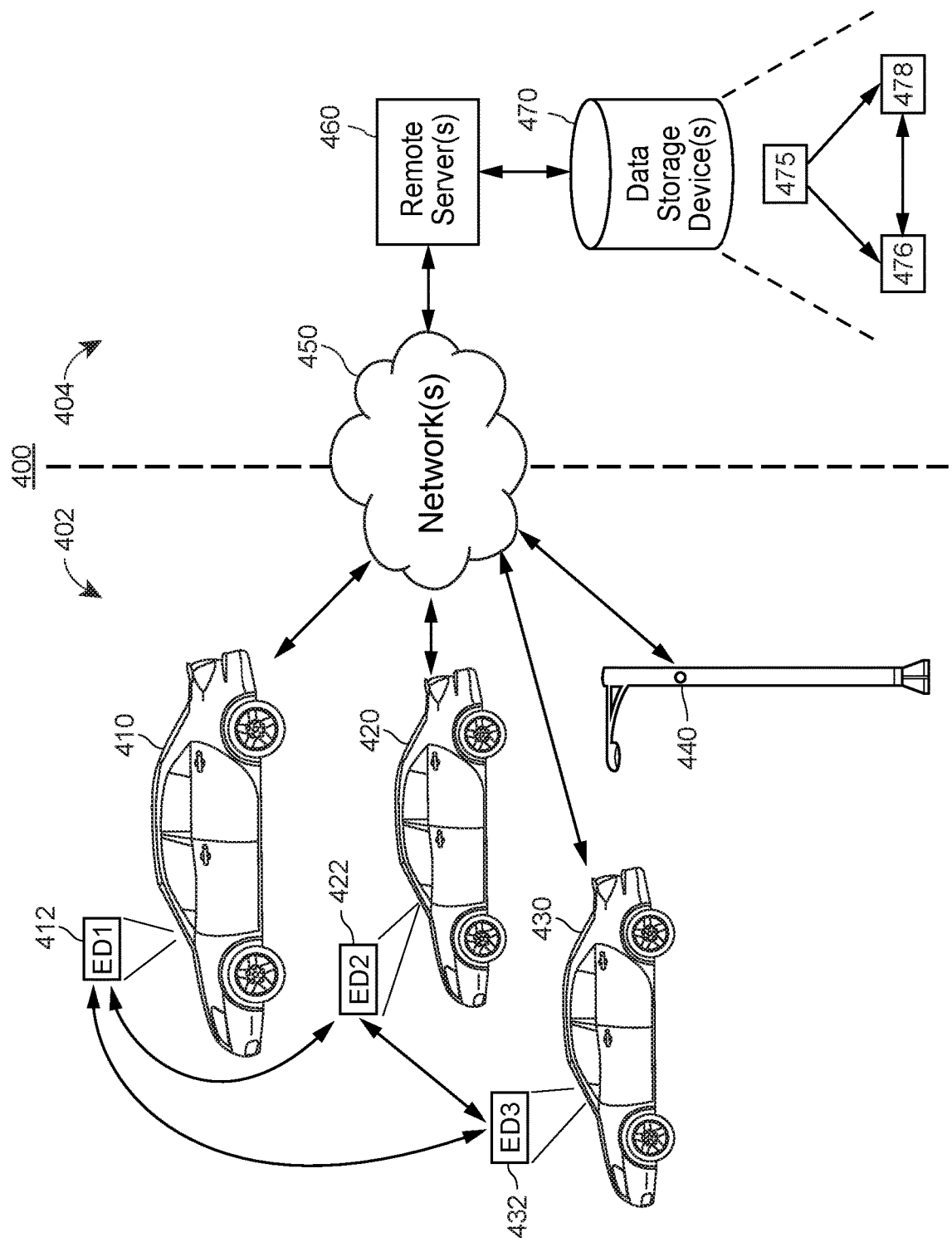
FIG. 4 depicts an exemplary block diagram of a wireless communication system interconnecting a subject vehicle and various components which may be utilized for real-time detection and mitigation of remote vehicle anomalous behavior, in accordance with some embodiments.

FIG. 4 illustrates an exemplary block diagram of an interconnected communication system 400 which may be utilized in conjunction with the novel systems, methods, and/or techniques disclosed herein. The high-level architecture of the system 400 illustrated in FIG. 4 may include both hardware and software applications, as well as various data communications channels, at least some of which are wireless data communications channels, for communicating data between the various hardware and software components, as is described below. The system 400 may be roughly divided into front-end components 402 and back-end components 404. Generally speaking, the front-end components 402 may obtain information regarding the behavior of vehicles (e.g., a car, truck, motorcycle, etc.) that are being operated by respective drivers. The front-end components 402 may include, for example, one or more on-board vehicle electronic devices, e.g., the on-board vehicle electronic devices 412, 422, 432 that are respectively being transported by the vehicles 410, 420, 430. The front-end components may also include one or more on-board sensors (not shown) that are being transported by one or more of the vehicles 410, 420, 430, and/or one or more off-board sensors 440 disposed in the environment in which the vehicles 410, 420, 439 are operating. In an embodiment, the one or more on-board vehicle electronic devices may include one or more of the electronic devices 110, 115, 230, 312, 322, 332; the one or more on-board sensors may include one or more of the on-board sensors 220, 314, 324, 334; and/or one or more off-board sensors 440 may include one or more of the off-board sensors 354. Generally speaking, in the system 400, any of electronic devices 412, 422, 432 may be communicatively connected in a wireless manner with any one or more others of the electronic devices 412, 422, 432, e.g., via a direct wireless connection, or via a wireless connection to one or more networks 450, which may serve as an intermediary router between electronic devices 412, 422, 432. Similarly, any of electronic devices 412, 422, 432 may be communicatively connected in a wireless manner with one or more off-board sensors 440, e.g., via a direct wireless connection, or via a wireless connection to the one or more networks 450, which may serve as an intermediary router between the electronic devices 412, 422, 432 and one or more off-board sensors 440.

The back-end components 404 may be communicatively connected to the front-end components 402 via the one or more networks 450. The one or more networks 450 may support any one or more types of data communication using one or more wired and/or wireless standards or technologies (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and/or others). The one or more networks 450 may include one or more private networks, local networks, and/or dedicated frequency bands. In some embodiments, the one or more networks 450 may include one or more public networks, such as the Internet or cellular data networks, and/or may include one or more private networks.

Additionally, the back-end components 404 may include a remote server 460 that may interface with (e.g., read-only, or read-write) one or more data storage devices 470 (which is also referred to interchangeably herein as "one or more databases 470"). The one or more databases 470 may contain or store various information and data, such as data and/or information 475 that is indicative of the historical behavior of a plurality of vehicles while the vehicles were operated over a plurality of routes and in varying associated contextual conditions (e.g., weather conditions, road topography, traffic conditions, road conditions, and/or other environmental conditions). At least a portion of the historical vehicle behavior information 475 may have been obtained by on-board and/or off-board sensors associated with a plurality of vehicles, for example, and optionally from or based upon one or more third-party data feeds (e.g., a weather data feed, an IoT (Internet of Things) sensor network implemented in a city, etc.). The one or more data storage devices 470 may also contain or store other information pertaining to vehicle operations, such as information/data indicative of roadways which may be utilized for navigation directions (not shown), driver performance scores or indications, etc. The one or more data storage devices for databases 470 may be implemented by one or more data storage entities, such as by a data bank, cloud data storage, and/or any other suitable implementation. Similarly, the remote server 460 may be implemented by one or more computing devices, such as by a bank of servers, a computing cloud, and/or any other suitable implementation. For ease of discussion (and not for limitation purposes), though, the remote server 460 and the data storage device/database 470 are referred to herein using the singular tense.

Figure 5:
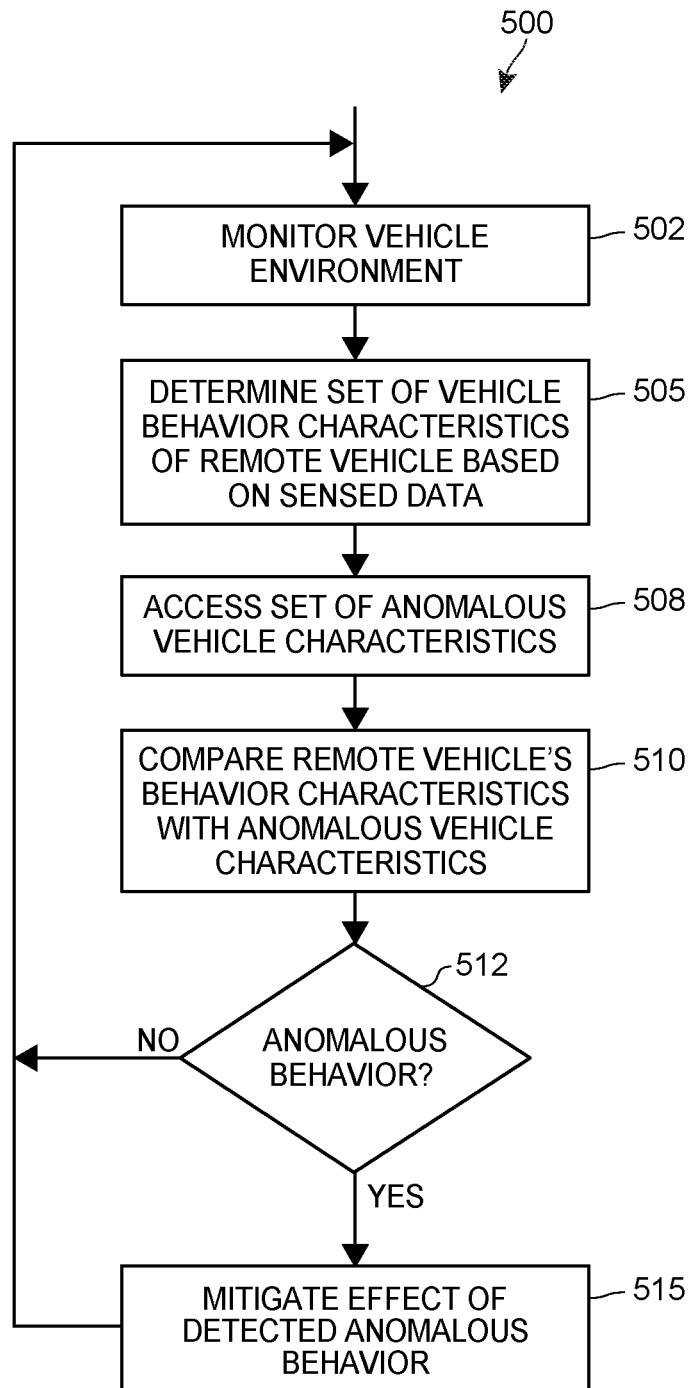
FIG. 5 depicts a flow diagram of an example method for detecting and mitigating remote vehicle anomalous behavior in real-time, in accordance with some embodiments.

FIG. 5 depicts a flow chart of an example method 500 for detecting and mitigating anomalous behavior of a vehicle. At least a portion of the method 500 may be performed, in an embodiment, by a vehicle electronic device, such as the vehicle electronic device 110 and/or the portable electronic device 115 disposed at the vehicle 100, the electronic device 230 disposed at the vehicle 210, the electronic devices 312, 322, 332 respectively disposed at the vehicles 310, 320, 330, and/or the electronic devices 412, 422, 432 respectively disposed at the vehicles 410, 420, 430. In some embodiments, at least a portion of the method 500 may be performed by a vehicle electronic device and/or a portable electronic device in conjunction with one or more other vehicle and portable electronic devices disposed in other vehicles operating in the vicinity of the subject vehicle in which the electronic device is being transported, and/or in conjunction with a remote computing device or server, such as the remote server 460. For ease of discussion, and not for limitation purposes, the method 500 is discussed with simultaneous reference to FIGS. 1-4, although it is understood that the method 500 may operate in conjunction with other systems, vehicles, and/or computing devices.

At a block 502, the method 500 may include monitoring an environment in which a vehicle, e.g., a subject vehicle, is operating. For example, the environment in which the subject vehicle is operating may be the environment 300 shown in FIG. 3, or may be a similar or different environment in which vehicles may operate. The subject vehicle may be operated by a driver, or the subject vehicle may be fully- or partially-autonomously operated. The monitoring 502 of the subject vehicle's environment may include obtaining or collecting data generated by sensors that are associated with the subject vehicle. Such sensors may include one or more on-board sensors of the subject vehicle (e.g., the on-board sensors 220, 314, 324, or 334), for example. In some embodiments, the sensors associated with the subject vehicle and from which data is obtained or collected may include one or more off-board sensors associated with the subject vehicle. The one or more off-board sensors may include sensors that are disposed at other vehicles (e.g., in FIG. 3 the sensors 314, 334 are "off-board" with respect to the subject vehicle 320), and/or the one or more off-board sensors may include sensors that are disposed on or at infrastructure components or other non-vehicular objects that are located in the environment of the subject vehicle (e.g., one or more of the off-board sensors 354, 440).

The sensors that are associated with the subject vehicle (whether on-board and/or off-board) may detect or sense various conditions and/or objects in the subject vehicle's environment, as well as detect or sense changes in the various conditions, behaviors, and/or movements of the various objects. For example, the sensors may detect or sense a set of current environmental conditions, such as the presence and/or degree of traffic congestion, traffic construction, pedestrians, etc. Additionally or alternatively, the sensors may detect/sense a set of current weather conditions, such as the presence and/or degree of precipitation, icy roads, fog, etc., and/or the sensors may detect/sense a set of current road conditions, such as potholes, merging lanes, speed limit changes, and the like. Generally speaking, the sensors associated with the subject vehicle may sense or detect one or more of these and other contextual conditions, attributes, and/or behaviors which are included in the environment in which the subject vehicle is operating, and may generate data indicative of the sensed or detected conditions, e.g., "sensor data."

Importantly, at the block 502, the set of sensors that are associated with the subject vehicle may detect or sense the presence and movement of one or more other vehicles that are operating in the subject vehicle's environment, e.g., one or more remote vehicles that are within a threshold distance of the subject vehicle, and may generate sensor data corresponding thereto and/or indicative thereof. At least one of the sensed remote vehicles may be traveling on the same roadway as the subject vehicle, e.g., in the same direction or in an opposite direction. At least one of the sensed remote vehicles may be traveling on a different roadway in the vicinity of the roadway on which the subject vehicle is traveling. In an embodiment, the threshold distance may be indicative of a distance at which one or more sensors may collectively sense or detect at a given level of accuracy. The threshold distance may be determined based upon the sensitivity of the sensors and/or based upon other factors, such as the performance of the driver of the subject vehicle, the current speed of traffic flow, the current traffic density, etc.

At a block 505, the method 500 may include determining a set of characteristics that is indicative of one or more behaviors of a particular remote vehicle operating within the subject vehicle's environment. For clarity of discussion, the particular remote vehicle is referred to herein as a "target" remote vehicle. In an embodiment, determining 505 the set of characteristics indicative of the one or more behaviors of the target remote vehicle may include analyzing the sensor data that has been obtained or collected during the monitoring 502. For example, determining 505 the set of characteristics of the behavior of the target remote vehicle may include filtering the collected sensor data, cleaning the sensor data, and/or evaluating or interpreting at least some of the collected sensor data (which may be filtered and/or cleaned sensor data) to determine the set of characteristics indicative of the behavior of the target remote vehicle.

At a block 508, the method 500 may include accessing a set of anomalous vehicle behavior characteristics (an example of which is represented in FIG. 4 by the reference 476). The set of anomalous vehicle behavior characteristics 476 may correspond to a set of anomalous vehicle behaviors, such as different patterns of vehicle swerving, speeding up and slowing down, frequently changing, driving in two lanes, other inconsistent or erratic speed patterns, other inconsistent or erratic movement patterns, etc. Generally speaking, the set of anomalous vehicle behavior characteristics 476 may provide mappings between various anomalous vehicle behaviors and respective sets of vehicle behavior characteristics. That is, each anomalous vehicle behavior may be identified or characterized by a respective set of vehicle behavior characteristics (which may be, for example, a subset of the vehicle behavior characteristics included in the set of anomalous vehicle behavior characteristics). For example, a particular set of vehicle behavior characteristics that occur in combination over time may be indicative of a particular anomalous vehicle behavior.

The set of anomalous vehicle behavior characteristics 476 may be generated or determined from a set of historical vehicle behavior data, e.g., the set of historical vehicle behavior data 475 of FIG. 4, that includes data indicative of historical vehicle operations and behavior (and, optionally, data indicative of corresponding environmental conditions and contexts) that have been obtained for multiple vehicles along multiple routes and over multiple periods or intervals of time. In an embodiment, at least a portion of the historical vehicle behavior data 475 and the set of anomalous behavior characteristics 476 may be remotely stored at and accessed from the data storage device 470, for example, e.g., by utilizing any suitable local access mechanism (e.g., a function call, a database read, an API (Application Programming Interface), etc.) and/or any suitable remote access mechanism (e.g., a message exchange using a communication protocol, a remote API, etc.). In an embodiment, at least a portion of the historical vehicle behavior data 475 and the set of anomalous behavior characteristics 476 may be locally stored at and accessed from a data storage device or memory that is on-board the subject vehicle (not shown), for example, e.g., by utilizing any suitable local access mechanism (e.g., a function call, a database read, an API (Application Programming Interface), etc.) and/or any suitable remote access mechanism (e.g., a message exchange using a communication protocol, a remote API, etc.). At least some of the historical vehicle behavior data 475 may have been generated by and/or collected from multiple sets of on-board and/or off-board sensors associated with the multiple vehicles. Typically, but not necessarily, at least a portion of the historical vehicle behavior data 475 may be time-series data.

In an embodiment, at least a portion of the set of anomalous vehicle behavior characteristics 476 may be determined in real-time based upon historical vehicle behavior data 475. Additionally or alternatively, at least a portion of the set of anomalous vehicle behavior characteristics 476 may have been pre-determined, e.g., may have been determined from the historical vehicle behavior data 475 a priori. In an exemplary but non-limiting implementation, the one or more statistical analyses and/or learning techniques may be applied to the historical vehicle behavior data 475 to generate or create an anomalous vehicle behavior model 478, which may be, for example, a statistical model. The anomalous vehicle behavior model 478 may be generated in real-time, e.g., as a part of the block 508, in an embodiment. In another embodiment, the anomalous vehicle behavior model 478 may have been generated a priori, e.g., prior to the execution of the block 508. At any rate, the anomalous vehicle behavior model 478 may indicate or define the various weights or weightings of various vehicle behavior characteristics with respect to a particular anomalous vehicle behavior. As such, the analysis or analyses of the historical vehicle behavior data 475 may define the mappings between the various anomalous vehicle behaviors and the respective sets of vehicle behavior characteristics 476 that are indicative of the respective anomalous vehicle behaviors based upon one or more statistical analyses/learning techniques that are applied to the historical vehicle behavior data 475. Further, in addition to determining sets of vehicle behavior characteristics 476 that are indicative of anomalous vehicle behaviors, the analysis or analyses of the historical vehicle behavior data 475 may determine different thresholds and/or ranges of the vehicle behavior characteristics (e.g., over time, magnitudes, etc.) that are indicative of respective anomalous vehicle behaviors. Still further, in some embodiments, multiple models 478 may be generated as desired, e.g., for different types of anomalous vehicle behaviors, for determining the absence one or more of one or more anomalous vehicle behaviors in addition or alternatively to determining the presence of a particular anomalous vehicle behaviors, etc. At least some of the generated models 478 may be remotely stored at the data storage device 470 or some other remote memory, and/or at least some of the generated models 478 may be locally stored at a data storage device or memory that is on-board the subject vehicle (not shown).

At a block 510, the method 500 may include comparing the set of vehicle behavior characteristics indicative of one or behaviors of the remote vehicle (e.g., as determined at the block 505) with the set of anomalous vehicle behavior characteristics 476 (e.g., as determined or accessed at the block 508). In an embodiment, comparing 510 the set of vehicle behavior characteristics of the remote vehicle with a set of anomalous vehicle behavior characteristics 476 may include applying one or more models 478 to at least some of the set of vehicle behavior characteristics of the remote vehicle. For example, at least some of the set of vehicle behavior characteristics of the remote vehicle may be input into one or more models 478, and the one or more models 478 may output an identification or determination of one or more anomalous vehicle behaviors of the remote vehicle based upon the input vehicle behavior characteristics, where the one or more anomalous vehicle behaviors have been statistically determined, identified, or learned based upon the historical vehicle data 475. In some embodiments, other techniques for comparing 510 the set of vehicle behavior characteristics of the remote vehicle with the set of anomalous vehicle behavior characteristics 476 may be utilized, such as determining the presence or absence of certain vehicle behavior characteristics corresponding to a particular anomalous vehicle behavior, determining a threshold number of certain vehicle behavior characteristics corresponding to the particular anomalous vehicle behavior, and/or other suitable comparison techniques. At any rate, comparing 510 the set of vehicle behavior characteristics indicative of one or behaviors of the remote vehicle with a set of anomalous vehicle behavior characteristics 476 may include generating an indication of the respective presence or absence of one or more anomalous vehicle behaviors. In some embodiments, the comparison 510 may generate an indication of the respective identifications of detected anomalous vehicle behaviors, and optionally, a respective measure of confidence or percentage of likelihood for each identification.

At a block 512, the method 500 may include determining or detecting, based upon the comparison 510, whether or not the remote vehicle is exhibiting one or more anomalous behaviors. For example, the determination may be based upon an output of the one or more models 478, and/or an output of another comparison technique. Additionally or alternatively, a predetermined threshold corresponding to a measure of confidence or percentage of likelihood may be utilized to determine or detect 512 whether or not the remote vehicle is exhibiting anomalous vehicle behavior. In some embodiments, data indicative of contextual conditions in which the remote vehicle is operating (e.g., weather conditions, road topography, traffic conditions, road conditions, and/or other environmental conditions) may be utilized to determine or detect 512 anomalous vehicle behavior of the remote vehicle. In an embodiment, contextual condition data corresponding to the environment in which the remote vehicle is operating may be obtained by on-board sensors and/or off-board sensors associated with the subject vehicle. For example, if there is a pothole at a certain location in the road, data indicative of this particular contextual condition may factor into determining whether or not the swerving of a remote vehicle is considered anomalous for the given contextual condition. It is noted that, in some embodiments, the blocks 510 and 512 may be combined into an integral block. For example, sensed contextual condition data may be input along with the remote vehicle's behavior characteristics into one or more models 478 to determine whether or not the remote vehicle is exhibiting anomalous behavior.

If, at the block 512, the method 500 determines that the remote vehicle is not exhibiting anomalous behavior, the method 500 may return to the block 502 to continue monitoring the environment in which the subject vehicle is operating. If, at the block 512, the method 500 determines that the remote vehicle is exhibiting one or more anomalous behaviors, the method 500 may proceed to block 515.

At the block 515, the method 500 may include mitigating an effect of the detected anomalous behavior(s) of the remote vehicle. Mitigating 515 the effect of the remote vehicle's anomalous behavior(s) may include providing an indication of the detected, anomalous behavior of the remote vehicle to the subject vehicle. For example, an indication of the detected, anomalous behavior(s) of the remote vehicle may be provided at a user interface of the subject vehicle, e.g. via the vehicle electronic device 110 and/or the portable electronic device 115. Additionally or alternatively, a suggested mitigating action which the driver of the subject vehicle may choose to take (e.g., slow down, change lanes, re-route, etc.) may be provided at a user interface of the subject vehicle. In some embodiments, mitigating 515 the effect of the remote vehicle's anomalous behavior(s) may include automatically providing an instruction to one or more components of the subject vehicle to automatically modify an operation of the subject vehicle. For example, based upon the detected anomalous behavior(s) of the remote vehicle, the subject vehicle's speed may be automatically adjusted, the subject vehicle's brakes may be automatically applied, the subject vehicle may be re-routed, etc. Such automatic modifications may be applied to fully- or partially-autonomously operated subject vehicles, and/or may be applied to non-autonomously operated vehicles, as desired.

Mitigating 515 the effects of the remote vehicle's detected anomalous behavior(s) may include communicating with other vehicles in the vicinity of the subject vehicle (e.g., one or more proximate vehicles), in an embodiment. For example, indications of the detected, anomalous behavior of the remote vehicle and/or suggested mitigating actions for other drivers to take may be transmitted to the one or more proximate vehicles for presentation at their respective user interfaces. Additionally or alternatively, one or more instructions to automatically modify respective operations of one or more proximate vehicles may be transmitted to the proximate vehicles. In this manner, mitigating actions across multiple vehicles in the vicinity of the remote vehicle may be coordinated so that the chance of an accident or the occurrence of other undesirable effects of the remote vehicle's anomalous behavior is decreased.

In an embodiment, mitigating 515 the effects of the remote vehicle's detected anomalous behavior(s) may include automatically notifying a public authority of the remote vehicle's anomalous behavior. For example, if the identified anomalous behavior of the remote vehicle is consistent with that of the remote vehicle's driver having a stroke or being otherwise impaired, police and/or other medical personnel may be automatically notified, e.g., by transmitting communications from the subject vehicle to the appropriate public authorities via the network 450.

In some embodiments, the method 500 may include determining or identifying the one or more mitigating actions of the subject vehicle and/or of the one or more proximate vehicles (not shown). For example, in embodiments in which one or more models 478 are utilized, the one or more models 478 may output, based upon the remote vehicle's behavior characteristics that are input to the model(s) 478, an indication of one or more mitigating actions which may be taken to decrease the risk of an accident or other undesirable event due to the remote vehicle's anomalous behavior. As such, the one or more mitigating actions may be statistically determined/identified based upon historical vehicle data 475, the identified anomalous behavior of the remote vehicle, and/or the current contextual conditions of the vehicle environment. However, the determination of the suggested mitigating actions may be determined or identified using additional or alternate techniques. For example, the suggested mitigating actions may be additionally or alternatively determined based upon the driver of the subject vehicle (e.g., based upon the driver's driving performance, the driver's preferences, etc.), the present condition of the subject vehicle, whether or not any proximate vehicles are communicatively connected to the system 400, and/or other factors.

The method 500 may be performed at least in part by one or more electronic devices 110, 115, 230, 312, 322, 332 that are on-board the subject vehicle. In an embodiment, the entirety of the method 500 may be performed by the one or more electronic devices 110, 115, 230, 312, 322, 332 that are on-board the subject vehicle. In an embodiment, at least a portion of the method 500 is performed by the remote server 460. For example, the entirety of the method 500 may be performed by the server 460. In some embodiments, the method 500 is performed by the one or more electronic devices 110, 115, 230, 312, 322, 332 that are on-board the subject vehicle in conjunction with the server 460, e.g., via the network 450. Generally speaking, at least the steps 505-515 of the method 500 may be performed in real-time. That is, mitigating 515 the effect of anomalous behavior of a remote vehicle that has been detected/determined from sensed behavior of the remote vehicle (e.g., via the blocks 502, 505) may be performed or implemented in a short enough time interval so that any undesirable effects of the detected anomalous vehicle behavior may be mitigated or prevented.

Figure 6A:
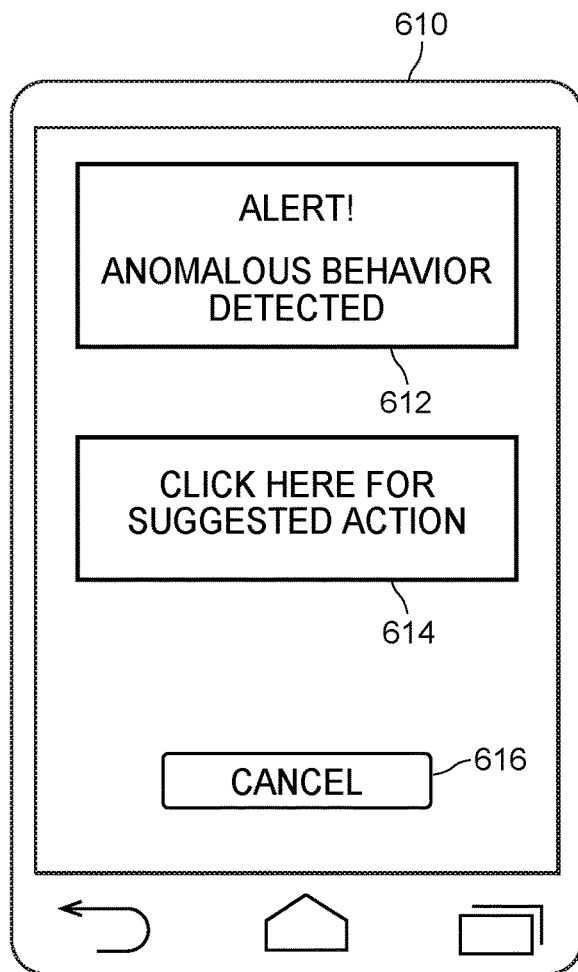
FIGS. 6A and 6B each depict a respective exemplary display for presentation on user interfaces and associated with displaying detected remote vehicle anomalous behavior and mitigation information, in accordance with some embodiments.

FIG. 6A illustrates an example display 610 that is associated with real-time detection and mitigation of remote vehicle anomalous behavior and that may be presented on a user interface on-board a subject vehicle, e.g., on a user interface of the electronic device 110, 115, 230, 312, 322, and/or 332. The display 610 may include an information box 612 that alerts the vehicle operator of a nearby remote vehicle that is exhibiting anomalous behavior. The display 610 may include a "CLICK HERE FOR SUGGESTED ACTION" selection 614 that enables an accessing to proceed to a subsequent interface that provides a suggested mitigation action to the accessing user. The display 610 may also include a "CANCEL" selection 616 that enables an accessing user to select to dismiss the display 610.

Figure 6B:
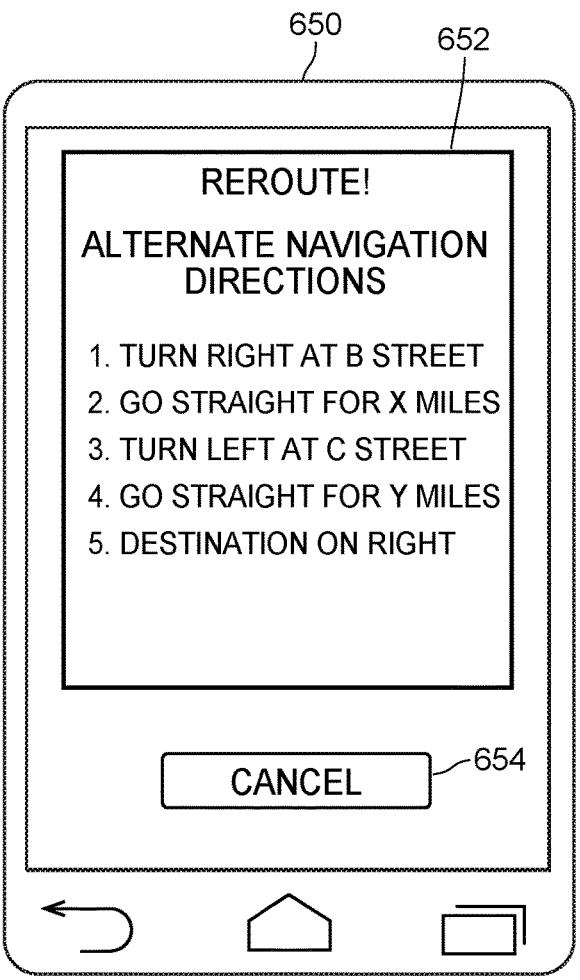

FIG. 6B illustrates another example display 650 that is associated with real-time detection and mitigation of remote vehicle anomalous behavior and that may be presented on a user interface on-board a subject vehicle, e.g., on a user interface of the electronic device 110, 115, 230, 312, 322, and/or 332. In some embodiments, the electronic device 110, 115, 230, 312, 322, 332 may present the display 650 in response to the user selecting the "CLICK HERE FOR SUGGESTED ACTION" selection 614 of FIG. 6A. The display 650 may include an information box 652 that identifies the mitigation action(s) (e.g., alternate navigation directions to circumvent the anomalous behavior of the remote vehicle, as illustrated in FIG. 6B). Additionally, the display 650 may also include a "CANCEL" selection 654 that enables an accessing user to select to dismiss the interface 650.

Figure 7:
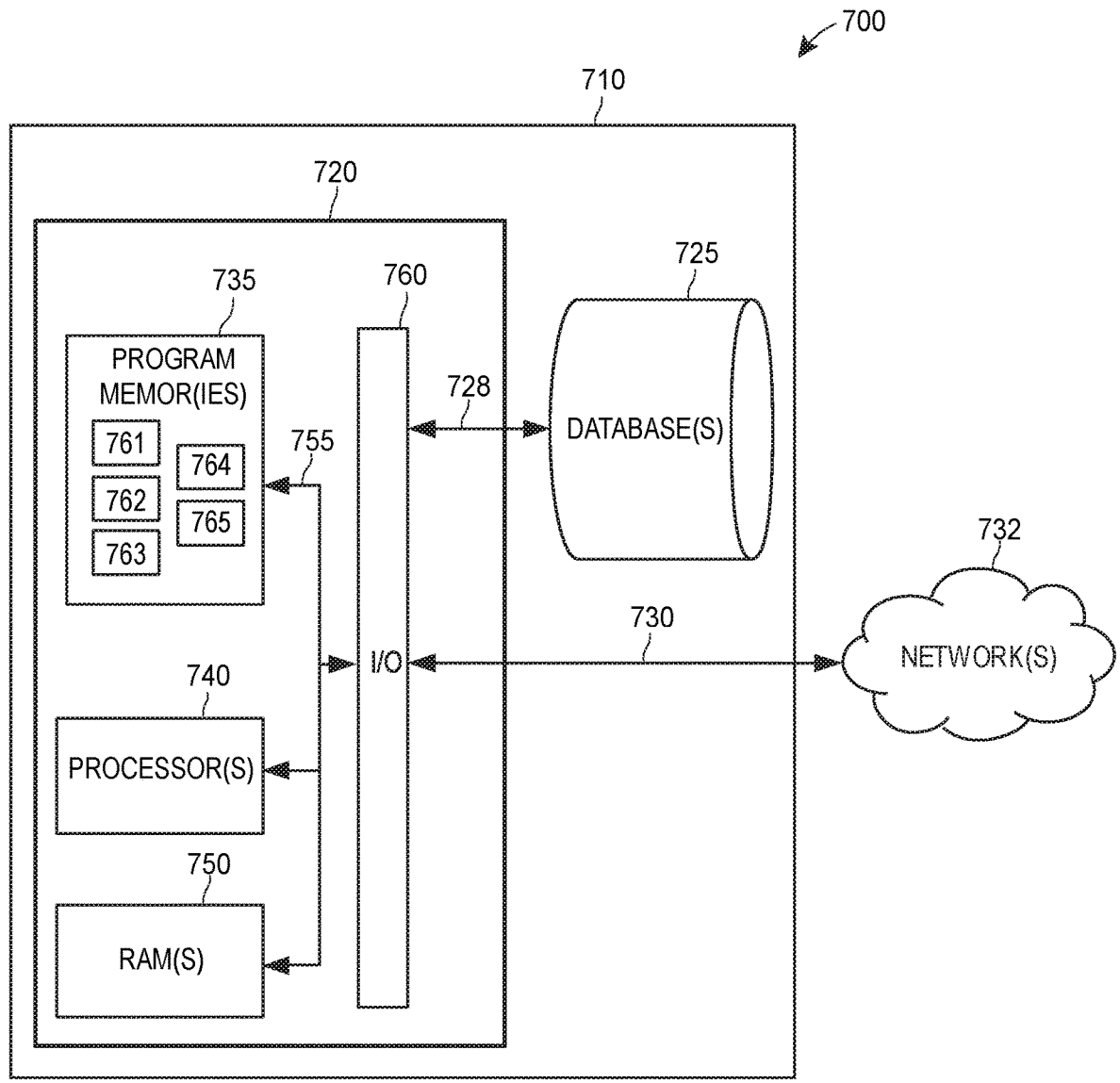
FIG. 7 provides a block diagram of an exemplary remote server which may be utilized in conjunction with embodiments of the systems, methods, and techniques for real-time detection and mitigation of remote vehicle anomalous behavior disclosed herein, in accordance with some embodiments.

FIG. 7 illustrates a block diagram 700 of an exemplary server 710 (such as the remote server 460 as discussed with respect to FIG. 4) in which at least some of the functionalities as discussed herein may be implemented. It should be noted that, although only a single server 710 is shown in FIG. 7, this is only one of many embodiments. In some embodiments, multiple servers 710 may be configured to have a logical presence of a single entity, such as a server bank or an arrangement known as "cloud computing." These configurations may provide various advantages, such as enabling near real-time uploads and downloads of information as well as periodic uploads and downloads of information. However, for ease of discussion and not for limitation purposes, the server 710 is referred to herein using the singular tense.

The server 710 may include one or more controllers 720 that are operatively connected to a data storage device, entity, or database 725 (such as the database 470 as discussed with respect to FIG. 4) via a link 728, which may include one or more local and/or remote links. The server 710 may access data stored in the data storage entity 725 when executing various functions, tasks, and/or techniques associated with the real-time detection and mitigation of remote vehicle anomalous behavior. It should be noted that although FIG. 7 depicts a single data storage entity 725, in embodiments the data storage entities 725 may be implemented by multiple physical data storage entities, such as a data bank or data farm.

The data storage device 725 may be adapted or configured to store data related to historical vehicle behavior data obtained by a plurality of sensors while a plurality of drivers operated a plurality of vehicles over a plurality of routes during various contextual conditions, e.g., the historical data 475. Additionally or alternatively, the data storage device 725 may store anomalous vehicle behavior models 478, sets of anomalous vehicle behavior characteristics 476, identities of anomalous vehicle behaviors in the respective mappings to the sets of vehicle behavior characteristics, and/or other data related to detecting and mitigating anomalous behavior of remote vehicles (not shown). At least some of the data stored at the data storage device 725 may be determined or generated based upon at least a portion of the historical vehicle behavior data 475, in an embodiment. In embodiments, the data storage device 725 may additionally store other types of data related to vehicle operations, vehicle environments, contextual conditions, driver performances, etc. Generally, at least some of the data points stored in the data storage device 725 may be time-stamped and may include an indication of a respective geo-location in which the data point was collected. That is, at least a portion of the data stored in the data storage device 725 may include time-series data.

It should be further noted that, while not shown, additional data storage devices or entities may be linked to the controller(s) 720 in a known manner, e.g., locally and/or remotely. For example, additional databases and/or data storage devices (not shown) that store various types of information (such as autonomous operation feature information, vehicle accidents, road conditions, vehicle insurance policy information, driver performance, or vehicle use information) may be locally and communicatively connected to the controller(s) 720 and/or to the server 710. Additional databases or data storage devices (not shown) may be remotely communicatively connected to the controller(s) 720 and/or to the server 710 via one or more links 730 to one or more networks 732, and may store data maintained by third parties (e.g., weather databases, road construction databases, traffic congestion databases, road network databases, IoT (Internet-of-Things) or sensor databases implemented by a city or other jurisdiction, etc.). In an embodiment, the one or more networks 732 may include the network 450 of FIG. 4.

The controller 720 may include one or more program memories 735, one or more processors 740 (which may be called a microcontroller or a microprocessor), one or more random-access memories (RAMs) 750, and an input/output (I/O) circuit 760, all of which may be interconnected via an address/data bus 755. It should be appreciated that although only one microprocessor 740 is shown, the controller 720 may include multiple microprocessors 740. Similarly, the memory of the controller 720 may include multiple RAMs 750 and multiple program memories 735, if desired. Although the I/O circuit 760 is shown as a single block in FIG. 7, it should be appreciated that the I/O circuit 760 may include a number of different types of I/O circuits. The RAM 750 and program memories 735 may be implemented as semiconductor memories, magnetically readable memories, biologically readable memories, or optically readable memories, for example. The controller 720 may also be operatively connected to the network 732 via the link 730.

The controller 720 may further include a number of applications 761-765 stored in its program memory 735. In an embodiment, the applications 761-765 comprise one or more software applications or sets of computer-executable instructions that are stored on the program memor(ies) 735 and executable by the processor(s) 740. In an embodiment, at least some of the applications 761-765 may be implemented at least partially in firmware and/or in hardware at the server 710. The various applications on the server 710 may include, for example, a monitoring application 761 for monitoring environments in which vehicles are operating; an anomalous vehicle behavior characteristics application 762 for generating an anomalous vehicle behavior model (e.g., the model 478) based upon a statistical analysis or a learning method performed on a set of historical vehicle behavior data; and an anomalous vehicle behavior comparison application 763 for comparing a set of characteristics indicative of one or more behaviors of a remote vehicle with the set of anomalous vehicle behavior characteristics, e.g., by applying the anomalous vehicle behavior model generated by the anomalous vehicle behavior characteristics application 762 to the set of characteristics indicative of the one or more behavior of the remote vehicle. The program memory 735 may also include any number of other applications 763-765. Generally speaking, the applications 761-765 may perform one or more techniques related to detecting and mitigating anomalous remote vehicle behavior in real-time. For example, one or more of the applications 761-765 may perform at least a portion of (and in some cases, the entirety of) any of the methods described herein.

The various applications may be executed on the same computer processor 740 or on different computer processors 740 in embodiments, as desired. Further, while the various applications 761-765 are depicted as separate applications, two or more of the applications 761-765 may be integrated as an integral application, if desired. In some embodiments, at least one of the applications 761-765 may be implemented in conjunction with another application (not shown) that is stored and executed at the server 710, such as a navigation or routing application.

Figure 8:
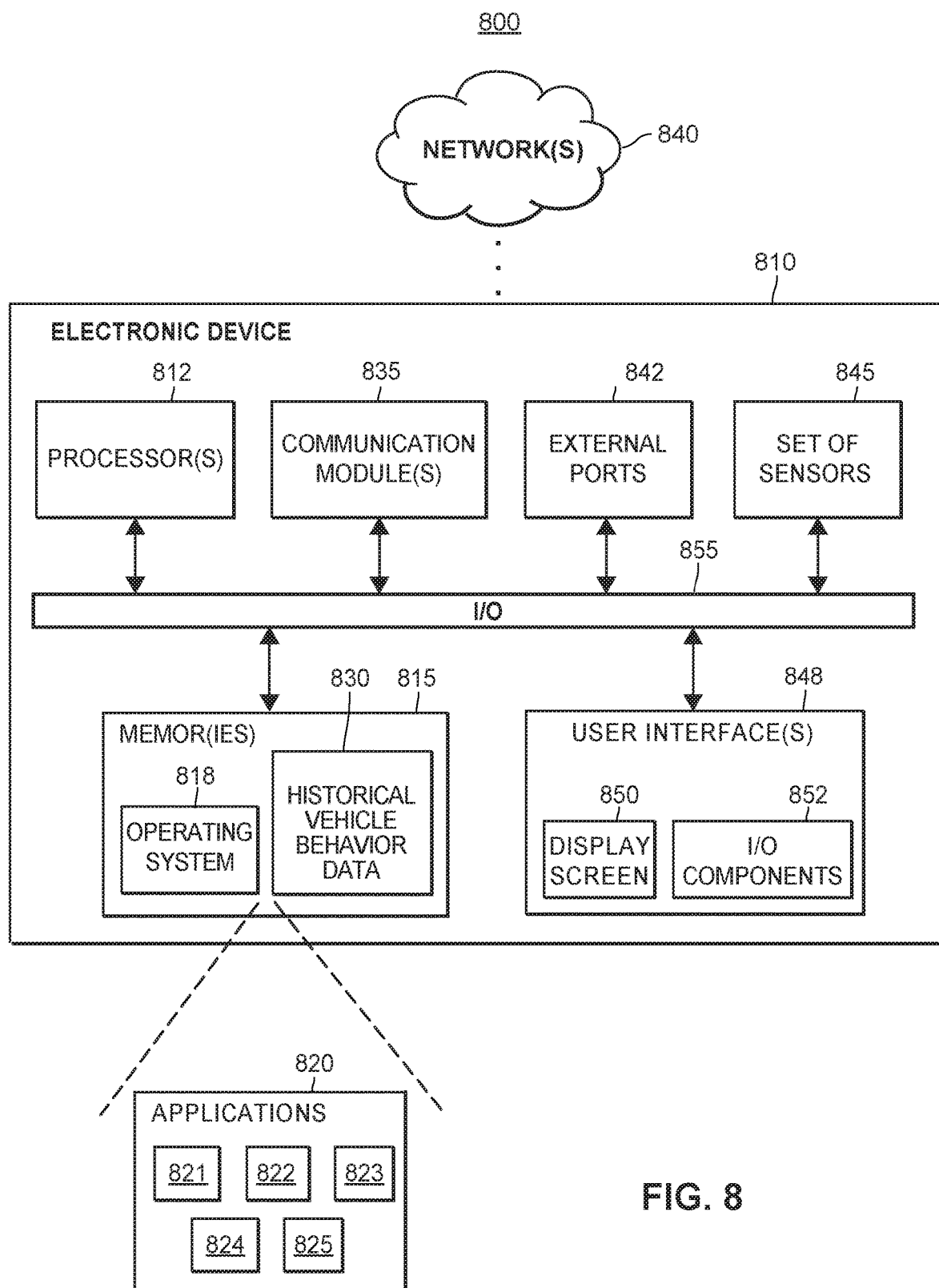
FIG. 8 provides a block diagram of an exemplary electronic device which may be utilized in conjunction with embodiments of the systems, methods, and techniques for real-time detection and mitigation of remote vehicle anomalous behavior disclosed herein, in accordance with some embodiments.

FIG. 8 illustrates a block diagram 800 of an exemplary local electronic device 810 (such as one or more of the electronic devices 110, 115, 230, 312, 322, 332) in which at least some of the functionalities as discussed herein may be implemented. It should be appreciated that the local electronic device 810 may be configured to be transported in a vehicle and/or to connect to an on-board telematics platform of the vehicle, as discussed herein. Further, it should be appreciated that the local electronic device 810 may be integrated into an on-board system of the vehicle. In some implementations, the local electronic device 810 may operate in conjunction with a remote server (e.g., the remote server 460, the server 710) to perform at least some of the functionalities described herein.

The local electronic device 810 may include a processor 812 and a memory 815. The memory 815 may store an operating system 818 capable of facilitating the functionalities as discussed herein as well as a set of applications 820 (e.g., which may be implemented as machine readable or computer-executable instructions). The operating system 818 may include one of a plurality of general purpose or mobile platforms, such as the Android™, iOS®, or Windows® systems, developed by Google Inc., Apple Inc., and Microsoft Corporation, respectively. Alternatively, the operating system 818 may be a custom operating system designed for the on-board electronic device 810. The processor 812 may interface with the memory 815 to execute the operating system 818 and the set of applications 820, and to access data stored in the memory 815. The memory 815 may include one or more forms of tangible, non-transitory volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Turning to the applications 820 stored at the local electronic device 810, in an embodiment, one of the set of applications 820 may be a monitoring application 821 for monitoring an environment in which the vehicle that is transporting the local electronic device 810 (e.g., the subject vehicle) is operating. Another application may be an anomalous vehicle behavior application 822 configured to apply an anomalous vehicle behavior model (e.g., the model 478) to determine if a remote vehicle is exhibiting anomalous behavior and provide mitigation action to the vehicle operator if the remote vehicle is exhibiting anomalous behavior. Another one of the set of applications 820 may be a navigation application 823 configured to generate navigation directions. Still another one of the set of applications 820 may be a log generation application 824 configured to generate and record logs including various vehicle operation data. Each of the set of applications 820 may access each other in order to effectively perform its function. For example, the anomalous vehicle behavior application 822 may interface with the navigation application 823 to generate alternate navigation directions to mitigate the effect of detecting that a remote vehicle is exhibiting anomalous behavior. In another example, the anomalous vehicle behavior application 822 may interface with the log generation application 823 to log a record of a determined anomalous behavior of a remote vehicle. It should be appreciated that one or more other applications 824, 825 are envisioned. Generally speaking, the applications 820 may perform one or more techniques related to detecting and mitigating anomalous remote vehicle behavior, e.g., in real-time. For example, one or more of the applications 821-825 may perform at least a portion of (and in some cases, the entirety of) any of the methods described herein. In some embodiments, one or more applications 821-825 may operate in conjunction with one or more applications 761-765 at the remote server 460 to perform at least a portion of (and in some cases, the entirety of) any of the methods described herein.

Additionally, the various applications 820 may be executed on the same computer processor 812 or on different computer processors. Further, while the various applications 821-825 are depicted as separate applications, two or more of the applications 821-825 may be integrated as an integral application, if desired. In some embodiments, at least one of the applications 821-825 may be implemented in conjunction with another application (not shown) that is stored and executed at the device 810, e.g., a user interface application, a driver performance evaluation application, etc.

According to some embodiments, the memory 815 may also include a set of historical vehicle behavior data 830 obtained by a plurality of sensors while a plurality of drivers operated a plurality of vehicles over various routes during various contextual conditions, e.g., the historical data 475. Additionally or alternatively, the memory 815 may store anomalous vehicle behavior models 478, anomalous vehicle behavior characteristics 476, identities of anomalous vehicle behaviors in the respective mappings to sets of vehicle behavior characteristics, and/or other data related to detecting and mitigating anomalous behavior of remote vehicles (not shown). At least some of the data stored in the memory 815 may be determined or generated based upon at least a part of the historical vehicle behavior data 830, in an embodiment. In embodiments, the memory 815 may additionally store other types of data related to vehicle operations, vehicle environments, contextual conditions, driver performances, etc. Generally, at least some of the data points of the historical vehicle behavior data 830 (and optionally, other data stored in the memory 815) may be time-stamped and may include an indication of a respective geo-location in which the data point was collected. That is, at least a portion of the data stored in the memory 815 may include time-series data.

In some implementations, the anomalous vehicle behavior application 821 and/or other applications 822-825 may interface with the set of historical vehicle behavior data 830 and other data stored on the memory 815 in order to determine if a remote vehicle is exhibiting anomalous behavior. In some embodiments, the anomalous vehicle behavior application 821 and/or other applications 822-825 may interface with or otherwise be communicatively connected to other data storage mechanisms (e.g., one or more hard disk drives, optical storage drives, solid state storage devices, etc.) that reside within the vehicle via which the local electronic device 810 is being transported, and/or that are accessible to the remote server 460.

As such, the on-board electronic device 810 may further include a communication module 835 configured to communicate data, e.g., directly to another device, or via one or more networks 840. For example, the network(s) 840 may include the network(s) 450 and/or the network(s) 732. According to some embodiments, the communication module 835 may include one or more transceivers which may be configured to receive and transmit data via one or more external ports 842. The one or more transceivers may operate in accordance with any suitable communication protocol, such as those used for wireless telephony (e.g., GSM, CDMA, LTE, etc.), Wi-Fi or other 802.11 standards, WiMAX, etc. Further, the communication module 835 may include a short-range network component (e.g., an RFID reader, a Bluetooth transceiver, an infrared transceiver, etc.) that is configured for short-range network communications (not shown). For example, the communication module 835 may receive, via the short-range network component and/or one or more of the external ports 842, sensor data from a set of sensors, which may be on-board sensors and/or off-board sensors with respect to the subject vehicle by which the on-board electronic device 810 is being transported. For instance, the communication module 825 may receive sensor data generated by on-board sensors via a short-range network component or port, and may receive sensor data generated by off-board sensors from a remote server via the network 840 and/or directly from proximate vehicles.

The local electronic device 810 may further include a set of sensors 845. The set of sensors 845 may include, for example, a GPS unit, an accelerometer, a gyroscope, a magnetometer, a proximity sensor, a light sensor, a Hall Effect sensor, an optical sensor, an audio sensor, etc. The processor 812 and the set of applications 820 may interface with the set of sensors 845 to retrieve and process corresponding sensor data generated by the sensors 845 included in the local electronic device 810, which may be utilized to determine and mitigate anomalous vehicle behavior in real-time.

The local electronic device 810 may include a user interface 848 that is configured to present information to a user and/or receive inputs from the user. As shown in FIG. 8, the user interface 848 may include a display screen 850 and I/O components 852 (e.g., ports, capacitive or resistive touch sensitive input panels, keys, buttons, lights, LEDs, speakers, microphones, etc.). According to some embodiments, the user may access the electronic device 810 via the user interface 848 to review information and/or perform other functions or techniques related to detecting and mitigating anomalous behavior of a remote vehicle. The set of applications 820, external ports 842, communication module 835, memory 815, set of sensors 845, processor 812, and user interface 848 may interface with each other via an input/output (I/O) circuit 855.

In general, a computer program product in accordance with an embodiment may include one or more computer-usable, tangible, non-transitory storage media (e.g., standard random access memory (RAM), an optical disc, a universal serial bus (USB) drive, or the like) having computer-readable or computer-executable program code or instructions embodied or stored therein, wherein the computer-readable/executable program code/instructions may be adapted to be executed by the processor 812 (e.g., working in connection with the operating system 818) to facilitate any one or more of the novel techniques described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, Python, or any desired programming language).

Although the text herein sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Additionally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., hardwired, as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software (e.g., programmed) to perform certain operations at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and busses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A method, comprising:
monitoring, by one or more sensors associated with a first vehicle, a vehicle environment in which the first vehicle is operating;
determining, using one or more processors associated with the first vehicle and based upon sensor data generated by the one or more sensors, that a remote vehicle operating within the vehicle environment is exhibiting an anomalous behavior; and
communicating an indication of the anomalous behavior of the remote vehicle to an electronic device associated with a second vehicle for presentation via a user interface disposed in the second vehicle, the second vehicle being distinct from the remote vehicle.

2. The method of claim 1, wherein monitoring the vehicle environment comprises monitoring the vehicle environment using the data collected by at least one of:
a first set of sensors disposed at the first vehicle;
a second set of sensors disposed in the vehicle environment external to the first vehicle, the second set of sensors fixedly attached to one or more other vehicles operating in the vehicle environment; or
a third set of sensors disposed in the vehicle environment external to the first vehicle, the third set of sensors fixedly attached to one or more fixtures or infrastructure components disposed in the vehicle environment.

3. The method of claim 1, wherein monitoring the vehicle environment comprises monitoring a set of current behaviors of one or more other vehicles within a threshold distance of the first vehicle, the one or more other vehicles including the remote vehicle.

4. The method of claim 3, wherein monitoring the vehicle environment further comprises monitoring a set of current contextual conditions of the vehicle environment.

5. The method of claim 1, wherein determining that the remote vehicle is exhibiting the anomalous behavior includes comparing a set of characteristics indicative of one or more behaviors of the remote vehicle with a set of anomalous vehicle behavior characteristics by applying a model to the set of characteristics indicative of the one or more behaviors of the remote vehicle, the model generated based upon a statistical analysis or a learning method performed on a set of historical vehicle behavior data, the set of historical vehicle behavior data based upon data obtained by a plurality of sensors while a plurality of drivers operated a plurality of vehicles.

6. The method of claim 5, wherein determining the remote vehicle is exhibiting the anomalous behavior comprises determining the remote vehicle is exhibiting the anomalous behavior based upon an output generated from the application of the model to the set of characteristics indicative of the one or more behaviors of the remote vehicle.

7. The method of claim 6, wherein:
the output generated from the application of the model to the set of characteristics indicative of the one or more behaviors of the remote vehicle includes an indication of one or more mitigation actions corresponding to the anomalous behavior; and
mitigating the effect of the anomalous behavior further includes suggesting or performing the one or more mitigation actions.

8. The method of claim 1, further comprising mitigating the effect of the anomalous behavior of the remote vehicle by at least one of:
providing a first instruction to automatically modify an operating behavior of the first vehicle, the first instruction based upon the detected, anomalous behavior of the remote vehicle; or
providing a second instruction to automatically modify an operating behavior of the second vehicle operating within the vehicle environment, the second instruction based upon the detected, anomalous behavior of the remote vehicle.

9. The method of claim 1, further comprising mitigating an effect of the anomalous behavior of the remote vehicle by at least one of:
providing an indication of the detected, anomalous behavior of the remote vehicle for presentation via a user interface disposed in the first vehicle; or
providing an indication of a suggested modification to an operating behavior of the first vehicle for presentation via the user interface disposed in the first vehicle.

10. The method of claim 1, further comprising mitigating an effect of the anomalous behavior of the remote vehicle by automatically notifying a public safety authority of the detected, anomalous behavior of the remote vehicle.

11. The method of claim 1, further comprising determining the set of anomalous vehicle behavior characteristics based upon a set of historical vehicle behavior data, the set of historical vehicle behavior data including data indicative of historical contextual conditions.

12. A system, comprising:
one or more processors associated with a first vehicle, the one or more processors configured to receive sensor data generated by one or more sensors associated with the first vehicle;
one or more tangible, non-transitory computer-readable media coupled to the one or more processors; and
computer-executable instructions stored on the one or more tangible, non-transitory computer-readable media thereby particularly configuring the one or more tangible, non-transitory computer-readable media, the computer-executable instructions, when executed by the one or more processors, causing the system to:
monitor, via the one or more sensors, a vehicle environment in which the first vehicle is operating;
determine, based upon the sensor data, that a remote vehicle operating within the vehicle environment is exhibiting an anomalous behavior; and
communicating an indication of the anomalous behavior of the remote vehicle to an electronic device associated with a second vehicle for presentation via a user interface disposed in the second vehicle, the second vehicle being distinct from the remote vehicle.

13. The system of claim 12, wherein at least a portion of the one or more processors associated with the first vehicle is disposed in at least one of: (i) an electronic device that is fixedly attached to the first vehicle, or (ii) a portable device associated with the first driver and disposed in the first vehicle.

14. The system of claim 13, wherein:
the computer-executable instructions, when executed by the one or more processors, further cause the system to determine that the remote vehicle is exhibiting the anomalous behavior based on comparing a set of characteristics indicative of the one or more behaviors of the remote vehicle with a set of anomalous vehicle behavior characteristics; and wherein at least another portion of the one or more processors associated with the first vehicle is disposed at one or more remote servers that are associated with the first vehicle and that are communicatively connected, via one or more communication interfaces, to the at least one of the electronic device that is fixedly attached to the first vehicle, or the portable device associated with the first driver and disposed in the first vehicle; and at least a portion of the set of anomalous vehicle behavior characteristics is accessible to the one or more remote servers.

15. The system of claim 12, wherein the computer-executable instructions, when executed by the one or more processors, further cause the system to determine that the remote vehicle is exhibiting the anomalous behavior based on comparing a set of characteristics indicative of the one or more behaviors of the remote vehicle with a set of anomalous vehicle behavior characteristics; and wherein at least a subset of the set of anomalous vehicle behavior characteristics is generated from a set of historical vehicle behavior data by using at least one of a statistical analysis or a learning method, the set of historical vehicle behavior data corresponding to data obtained by a plurality of sensors while a plurality of drivers operated a plurality of vehicles.

16. The system of claim 12, wherein the set of sensors associated with the first vehicle operated by the first driver includes at least one of:
   a first set of sensors disposed at the first vehicle; or
   a second set of sensors disposed at one or more other vehicles operating in the vehicle environment; or
   a third set of sensors disposed on one or more stationary fixtures disposed in the vehicle environment.

17. The system of claim 12, wherein at least one of the first vehicle or the second vehicle is an autonomous vehicle.

18. The system of claim 12, wherein the first vehicle and the second vehicle are communicatively connected via one or more communication interfaces.

19. One or more non-transitory computer-readable storage media storing computer-readable instructions to be executed on one or more processors of a system, the computer-readable instructions, when executed by the one or more processors, causing the system to:
   monitor, by one or more sensors associated with a first vehicle, a vehicle environment in which the first vehicle is operating;
   determine, based upon sensor data generated by the one or more sensors, that a remote vehicle operating within the vehicle environment is exhibiting an anomalous behavior; and
   communicating an indication of the anomalous behavior of the remote vehicle to an electronic device associated with a second vehicle for presentation via a user interface disposed in the second vehicle, the second vehicle being distinct from the remote vehicle.

20. The one or more non-transitory computer-readable storage media of claim 19, wherein the computer-readable instructions, when executed by the one or more processors, further cause the system to at least one of:
   (a) provide a first instruction to automatically modify an operating behavior of the first vehicle, the first instruction based upon the detected, anomalous behavior of the remote vehicle;
   (b) provide a second instruction to automatically modify an operating behavior of the second vehicle operating within the vehicle environment, the second instruction based upon the detected, anomalous behavior of the remote vehicle;
   (c) provide an indication of the detected, anomalous behavior of the remote vehicle for presentation via at least one of a user interface disposed in the first vehicle or a user interface disposed in the second vehicle operating within the vehicle environment; or
   (d) provide an indication of a suggested modification to an operating behavior of the first vehicle for presentation via the user interface disposed in the first vehicle.

\* \* \* \* \*